US006839013B1

(12) United States Patent
Cummins et al.

(10) Patent No.: US 6,839,013 B1
(45) Date of Patent: Jan. 4, 2005

(54) INTEGRATED CIRCUIT WITH A HIGH RESOLUTION ANALOG TO DIGITAL CONVERTOR, A MICROCONTROLLER AND HIGH DENSITY MEMORY AND AN EMULATOR FOR AN INTEGRATED CIRCUIT

(75) Inventors: Timothy J. Cummins, Cratloe (IE); Eamonn Joseph Byrne, Mallow (IE); Dara Joseph Brannick, Claremorris (IE); Patrick Michael Mitchell, Killaloe (IE)

(73) Assignee: Analog Devices, Inc., Norwood, MA (US)

( * ) Notice: Subject to any disclaimer, the term of this patent is extended or adjusted under 35 U.S.C. 154(b) by 809 days.

(21) Appl. No.: 09/639,197

(22) Filed: Aug. 15, 2000

Related U.S. Application Data

(62) Division of application No. 09/020,021, filed on Feb. 6, 1998, now abandoned.

(51) Int. Cl.⁷ ............................................... H03M 1/12
(52) U.S. Cl. ..................................... 341/155; 341/120
(58) Field of Search ............................. 341/120, 121, 341/143, 155

(56) References Cited

U.S. PATENT DOCUMENTS

| 4,272,760 | A |   | 6/1981 | Prazak et al. |
|---|---|---|---|---|
| 5,224,070 | A |   | 6/1993 | Fandrich et al. |
| 5,242,848 | A |   | 9/1993 | Yeh |
| 5,313,618 | A |   | 5/1994 | Pawloski |
| 5,319,370 | A | * | 6/1994 | Signore ...................... 341/120 |
| 5,375,228 | A |   | 12/1994 | Leary et al. |

(List continued on next page.)

FOREIGN PATENT DOCUMENTS

| EP | 0 592 069 A1 | 4/1994 |
|---|---|---|
| EP | 0 757 356 A1 | 2/1997 |
| JP | 8-293566 | 11/1996 |
| WO | WO 97/30452 | 8/1997 |

OTHER PUBLICATIONS

"Data acquisition chip offers sensor–to–system solution", Electronic Products, Jan. 1999, pp. 39–40.

Leonard, Milt, "Self–programming microcontroller networks sensors and transducers", Electronic Design, Feb. 9, 1998, pp. 92,94.

(List continued on next page.)

*Primary Examiner*—Brian Young
(74) *Attorney, Agent, or Firm*—Wolf, Greenfield & Sacks P.C.

(57) ABSTRACT

An emulator couplable to an integrated circuit, the integrated circuit including a micro controller, a DMA controller, memory means and an ADC and the emulator being operable to read a block of data stored in a plurality of memory locations of the memory means and graphically to display a representation of at least a portion of the block of data. An integrated circuit including an ADC and reprogrammable non-volatile memory means, the ADC being arranged to read calibration values from the non-volatile memory means. An integrated circuit including a microcontroller, a DAC selected from a group consisting of a string DAC and a current source DAC and an operational amplifier coupled to the DAC output. An integrated circuit includes analog and digital circuitry, and has only two polysilicon layers on a C-MOS substrate.

20 Claims, 21 Drawing Sheets

U.S. PATENT DOCUMENTS

| | | |
|---|---|---|
| 5,390,317 A | 2/1995 | Weiss et al. |
| 5,426,769 A | 6/1995 | Pawloski |
| 5,467,200 A | 11/1995 | Ohsawa et al. |
| 5,488,688 A | 1/1996 | Gonzales et al. |
| 5,504,684 A | 4/1996 | Lau et al. |
| 5,515,320 A | 5/1996 | Miwa |
| 5,535,357 A | 7/1996 | Moran et al. |
| 5,581,695 A | 12/1996 | Knoke et al. |
| 5,627,784 A | 5/1997 | Roohparvar |
| 5,630,164 A | 5/1997 | Williams et al. |
| 5,651,128 A | 7/1997 | Gaultier |
| 5,686,917 A | 11/1997 | Odom et al. |
| 5,752,077 A | 5/1998 | Yiu et al. |
| 5,758,059 A | 5/1998 | Alexander |
| 5,767,729 A | 6/1998 | Song |
| 5,768,194 A | 6/1998 | Matsubara et al. |
| 5,781,750 A | 7/1998 | Blomgren et al. |
| 5,784,284 A | 7/1998 | Taraki |
| 5,796,139 A | 8/1998 | Fukase |
| 5,805,865 A | 9/1998 | Mimura et al. |
| 5,835,788 A | 11/1998 | Blumer et al. |
| 5,848,026 A | 12/1998 | Ramamurthy et al. |
| 5,857,094 A | 1/1999 | Nemirovsky |
| 5,862,073 A | 1/1999 | Yeh et al. |
| 5,862,148 A | 1/1999 | Typaldos et al. |
| 5,872,954 A | 2/1999 | Matsushita |
| 5,873,112 A | 2/1999 | Norman |
| 5,898,862 A | 4/1999 | Vajapey |
| 5,900,008 A | 5/1999 | Akao et al. |
| 5,901,330 A | 5/1999 | Sun et al. |
| 5,937,423 A | 8/1999 | Robinson |
| 5,953,255 A | 9/1999 | Lee |
| 5,954,813 A | 9/1999 | Mann et al. |
| 5,956,277 A | 9/1999 | Roohparvar |
| 5,963,473 A | 10/1999 | Norman |
| 5,989,960 A | 11/1999 | Fukase |
| 6,009,496 A | 12/1999 | Tsai |
| 6,016,555 A | 1/2000 | Deao et al. |
| 6,230,119 B1 | 5/2001 | Mitchell |
| 6,289,300 B1 | 9/2001 | Brannick et al. |

OTHER PUBLICATIONS

Clinton Kuo et al., "A 512–kb EEPROM Embedded in a 32–b Microcontroller," *IEEE, Journal of Solid State Circuits,* vol. 2 No. 4, Apr. 1992, pp. 574–581.

Babb et al, "Logic Emulation with Virtual Wires", IEEE Trans on Computer–Aided Design of Int. Circuits and Systems, vol. 16, Issue 6, pp. 609–626, Jun. 1997.

Babb et al, "The RAW Benchmark Suite: Computation Structures for General Purpose Computing", Proc. $5^{th}$ Ann. IEEE Symp. on Field–Programmable Custom Computing Machines, pp. 134–143, Apr. 1997.

Dahl et al, "Emulation of the SPARCLE Microprocessor with the MIT Virtual Wireless Emulation System", Proc. IEEE Workshop FPGAs for Custom Comp. Machines, pp. 14–22, Apr. 1994.

Babb et al, "Virtual Wires: Overcoming Pin Limitations in FPGA–based Logic Emulators", Proc. IEEE Workshop on FPGAs for Custom Comp. Machines, pp. 142–151, Apr. 1993.

"Ikos Grabs Emulation Firm, VMW", Electronic Engineering Times, pp. 1, Mar. 18, 1996.

Motorola, DSP56100 Technical Data, Section 10, On–Chip Emulation (OnCE), non date.

Motorola, Digital Signal Processor (DSP), Application Development System (ADS) User's Manual, Sections 1–6, non date.

\* cited by examiner

| Address | D7 | D6 | D5 | D4 | D3 | D2 | D1 | D0 | Description |
|---|---|---|---|---|---|---|---|---|---|
| 402000H | 0 | 0 | 0 | 1 | | | | | Convert ADC Ch #1 |
| 402001H | | | | | | | | | |
| 402002H | 0 | 0 | 1 | 0 | | | | | Convert ADC Ch #2 |
| 402003H | | | | | | | | | |
| 402004H | 0 | 1 | 0 | 1 | | | | | Convert ADC Ch#5 |
| 402005H | | | | | | | | | |
| 402006H | 0 | 0 | 1 | 1 | | | | | Convert ADC Ch #3 |
| 402007H | | | | | | | | | |
| 402008H | 1 | 0 | 0 | 0 | | | | | Convert Temp Sensor |
| 402009H | | | | | | | | | |
| 40200AH | 1 | 1 | 1 | 1 | | | | | Stop DMA |

| Address | D7 | D6 | D5 | D4 | D3 | D2 | D1 | D0 | Description |
|---|---|---|---|---|---|---|---|---|---|
| 402000H | 0 | 0 | 0 | 1 | D12 | D11 | D10 | D9 | ADC Ch #1 High Byte |
| 402001H | D8 | D7 | D6 | D5 | D4 | D3 | D2 | D1 | ADC Ch #1 Low Byte |
| 402002H | 0 | 0 | 1 | 0 | D12 | D11 | D10 | D9 | ADC Ch #2 High Byte |
| 402003H | D8 | D7 | D6 | D5 | D4 | D3 | D2 | D1 | ADC Ch #2 Low Byte |
| 402004H | 0 | 1 | 0 | 1 | D12 | D11 | D10 | D9 | ADC Ch #5 High Byte |
| 402005H | D8 | D7 | D6 | D5 | D4 | D3 | D2 | D1 | ADC Ch #5 Low Byte |
| 402006H | 0 | 0 | 1 | 1 | D12 | D11 | D10 | D9 | ADC Ch #3 High Byte |
| 402007H | D8 | D7 | D6 | D5 | D4 | D3 | D2 | D1 | ADC Ch #3 Low Byte |
| 402008H | 1 | 0 | 0 | 0 |  |  |  |  | Convert Temp Sensor |
| 402009H |  |  |  |  |  |  |  |  |  |
| 40200AH | 1 | 1 | 1 | 1 |  |  |  |  | Stop DMA |

Fig. 7

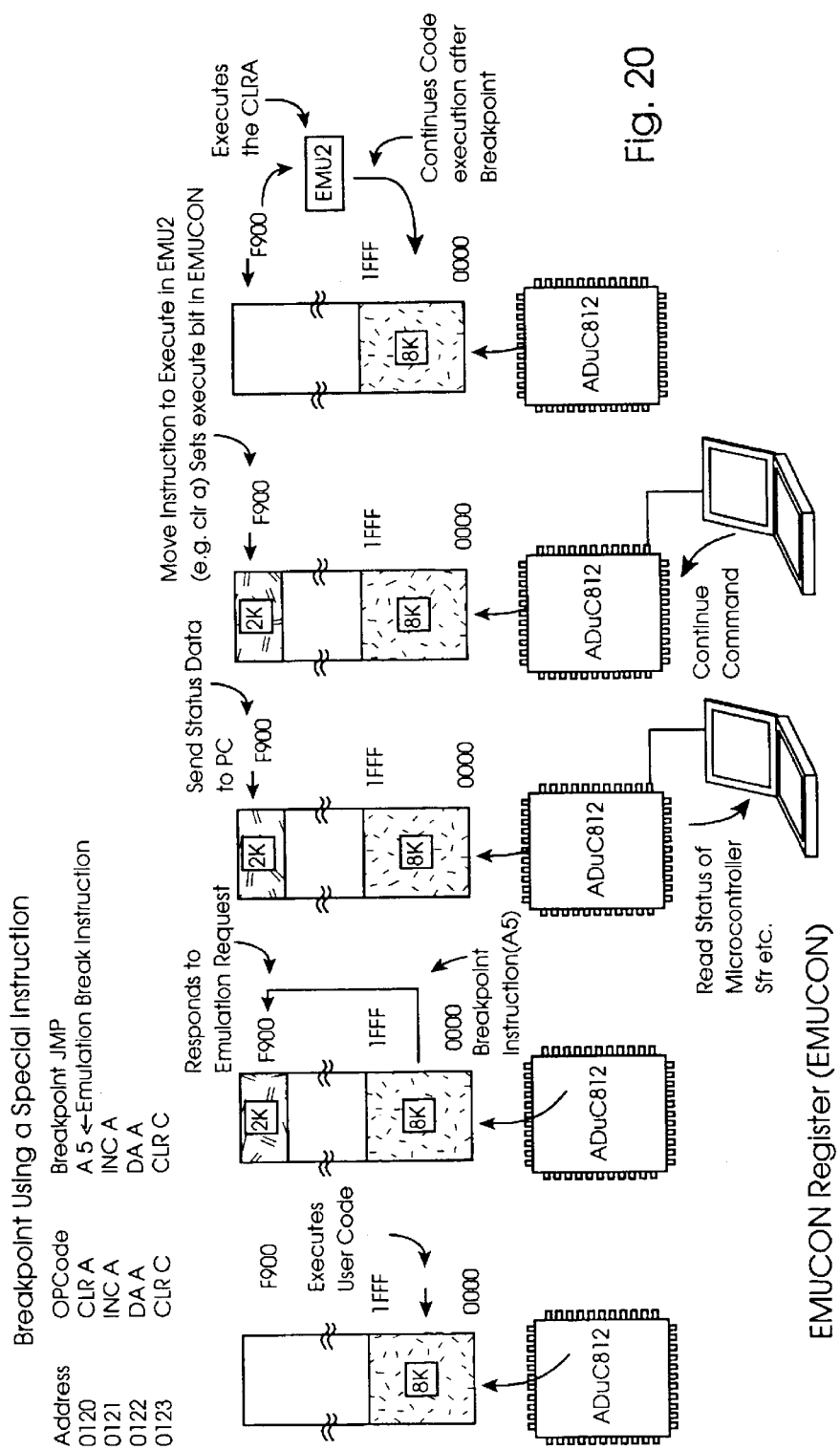

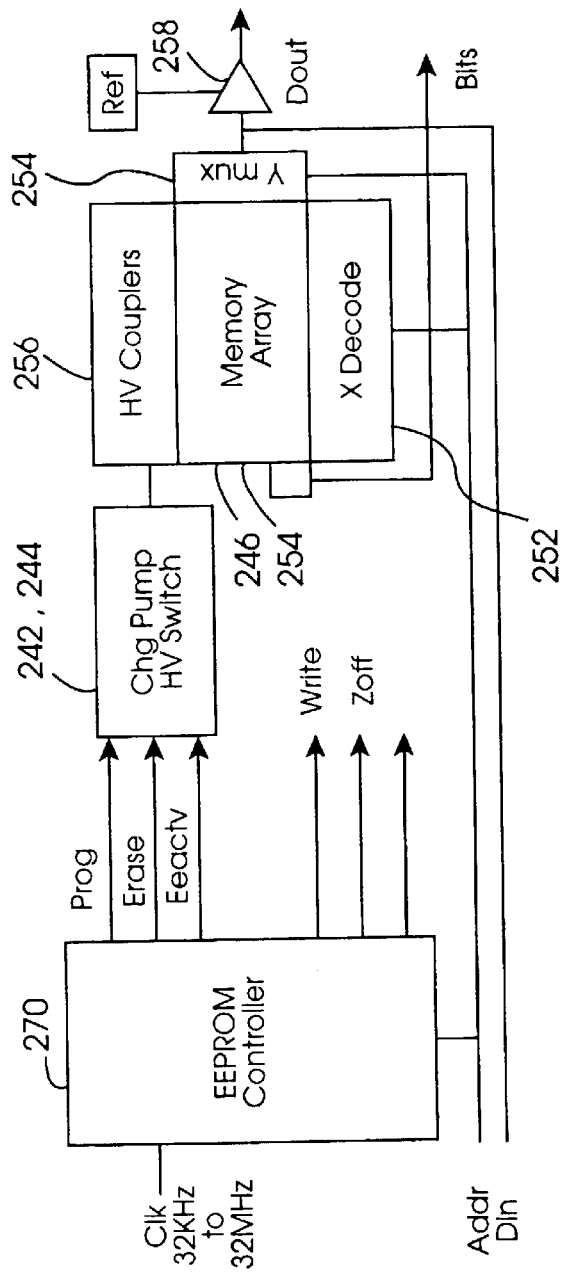
Fig. 26
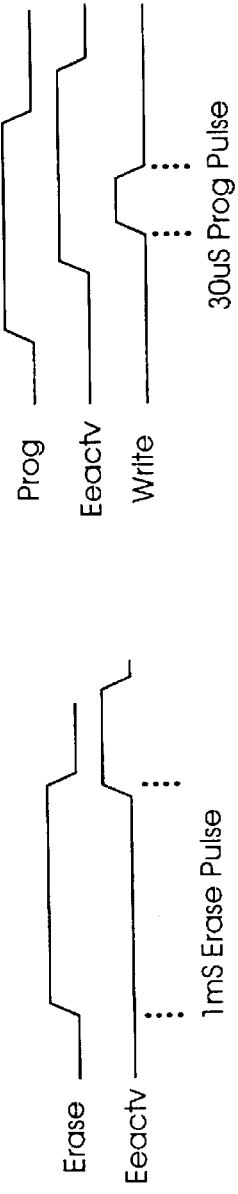
Fig. 27(b)
Fig. 27(a)

INTEGRATED CIRCUIT WITH A HIGH RESOLUTION ANALOG TO DIGITAL CONVERTOR, A MICROCONTROLLER AND HIGH DENSITY MEMORY AND AN EMULATOR FOR AN INTEGRATED CIRCUIT

This application is a divisional of application Ser. No. 09/020,021, filed Feb. 6, 1998, entitled AN INTEGRATED CIRCUIT WITH A HIGH RESOLUTION ANALOG TO DIGITAL CONVERTOR, A MICROCONTROLLER AND HIGH DENSITY MEMORY AND AN EMULATOR FOR AN INTEGRATED CIRCUIT, now abandoned.

FIELD OF THE INVENTION

The present invention relates to an integrated circuit and an emulator for an integrated circuit.

BACKGROUND OF THE INVENTION

There is a need for precision analog circuitry to be integrated on the same chip as a microcontroller and memory. To date this has proved difficult not least because of difficulties fabricating the different devices required using a semiconductor process which provides good yield and which is not extravagant in its use of die area and/or number of masks.

Furthermore, these is a need to provide convenient emulation of such devices without the need for special versions of the integrated circuit to be produced or cumbersome clip pods to be used.

SUMMARY OF THE INVENTION

A first aspect of the invention provides, an emulator couplable to an integrated circuit, the integrated circuit including a microcontroller, a DMA controller, memory means and an ADC and the emulator being operable to read a block of data stored in a plurality of memory locations of the memory means and graphically to display a representation of at least a portion of the block of data.

The memory means may be internal or external memory means.

In this way, the emulator may, for example, display the portion in an oscilloscope or spectrum analyzer representation.

A second aspect of the invention provides an integrated circuit including an ADC and reprogrammable non-volatile memory means, the ADC being arranged to read calibration values from the non-volatile memory means.

This allows the characteristics of the ADC to be altered, for example, to accommodate a non-linear transducer or to null out offset or other errors in the ADC or external circuitry. It is particularly suitable for a circuit which is expected to be mounted in an inaccessible position since the calibration values may be altered with the circuit in situ.

A third aspect of the invention provides an integrated circuit including a microcontroller, a DAC selected from a group consisting of a string DAC and a current source DAC and an operational amplifier coupled to the DAC output.

According to a fourth aspect of the invention an integrated circuit includes analog and digital circuitry, and has only two polysilicon layers on a C-MOS substrate.

BRIEF DESCRIPTION OF THE DRAWINGS

The present invention will now be described by way of example with reference to the drawings in which:

FIG. 7 shows a portion of external memory after continuous conversion;

FIG. 20 schematically illustrates an emulation using a single step break point instruction;

FIG. 21 shows a layout of a special purpose emulation register;

FIG. 26 schematically illustrates the connections between the EEPROM controller and the memory array;

FIGS. 27a and 27b are simplified timing diagrams for an erase and a write operation, respectively;

DETAILED DESCRIPTION

DMA

Figure 1:
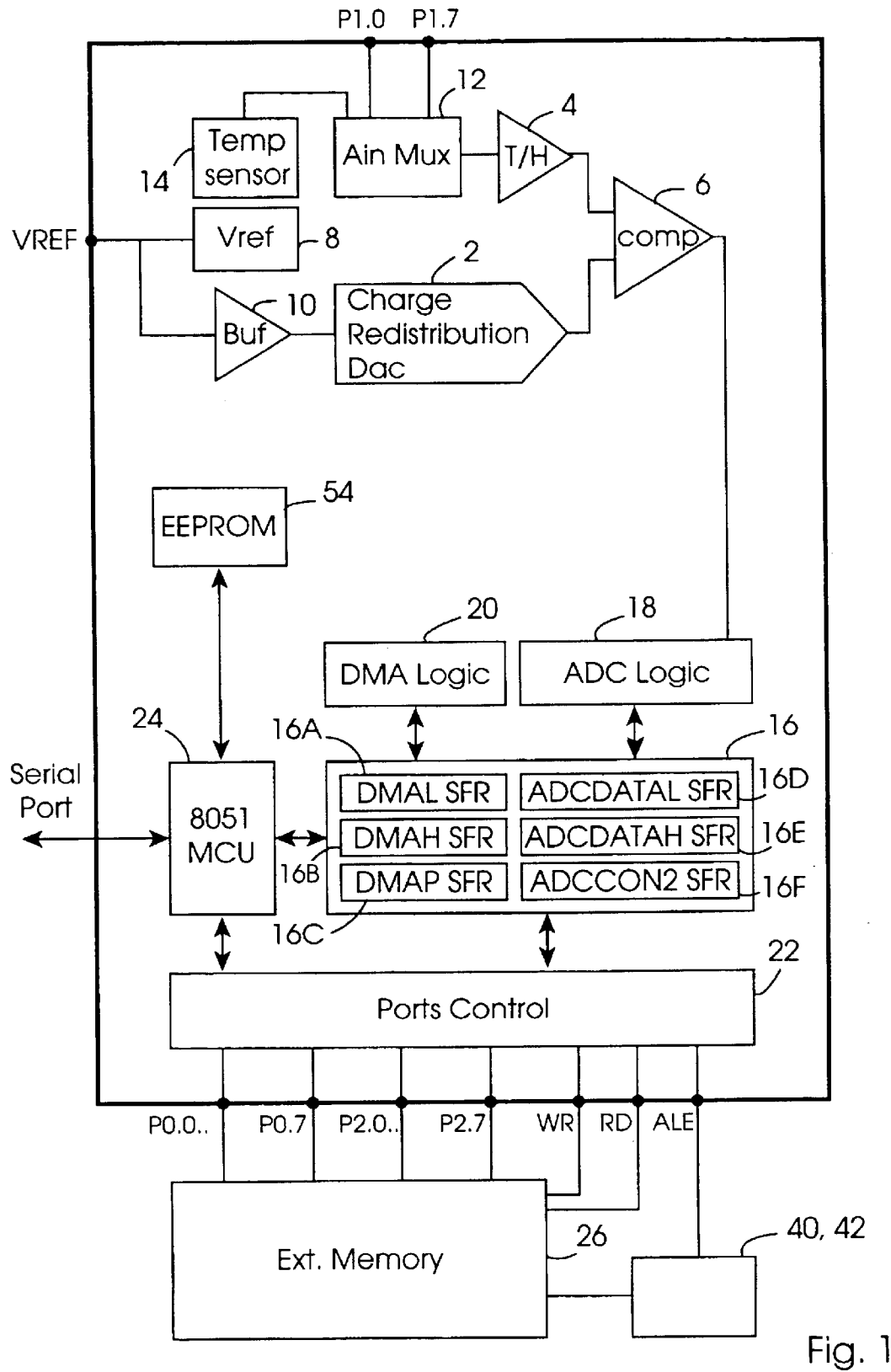
FIG. 1 is a schematic block diagram of a microcontroller, DMA controller, ADC and external memory.

With reference to FIG. 1, an ADC, DMA control logic and an 8051 microcontroller are shown connected to external memory.

The ADC is a successive approximation converter having a charge redistribution digital-to-analog converter (DAC) 2, a track and hold circuit 4 both coupled to a comparator 6. The design includes a reference voltage generator 8 connected via a buffer 10 to the input of the DAC 2.

Conventional microcontroller integrated circuits have required a DAC to be implemented using a timer to generate a pulse-width-modulated (PWM) signal which is fed into a large capacitor to smooth the PWM signal and to produce a signal having a voltage which varies depending on the mark-space ratio of the PWM signal. This at the very least is inconvenient since it uses up a timer/counter which could otherwise be used for other functions and requires microcontroller intervention. In the embodiment described below, two dedicated DACs have been provided.

An analog multiplexer 12 is used to select either the output from a temperature sensor 14 or one of the eight analog inputs P1.0 to P1.7.

A register block 16 is coupled to ADC logic 18, DMA logic 20 and port control logic 22. The register block 16 contains DMA address SFRs 16A, 16B, 16C which are 8 bit SFRs containing the low byte, high byte and page address of the address in external memory which is being written to or read from during DMA operation. Thus, these registers form a 24 bit address pointer. Initially, these registers are loaded with the start address in external memory from which a channel id is first read and to which the corresponding conversion result is subsequently written during DMA continuous conversion. The address stored in these registers is incremented during DMA operation.

The register block 16 also includes two bit ADC data registers 16D, 16E which store temporary results of ADC conversions before storage in memory or are used to hold the result of a single conversion. The sixth register 16F is an 8 bit control register for the ADC. The ADC SFRs are described in more detail below.

An 8051 compatible microcontroller 24 is coupled to the port control logic 22 to provide external data and address buses and also to the register block 16. The microcontroller's interaction with the DMA logic and the ADC is achieved via the register block 16.

External memory 26 is connected to port 0 and port 2. These ports in conjunction with the write (WR), read (RD) and address latch enable (ALE) lines enable the microcontroller and the DMA logic 20 to read and write to the external memory.

Figures 2, 3:
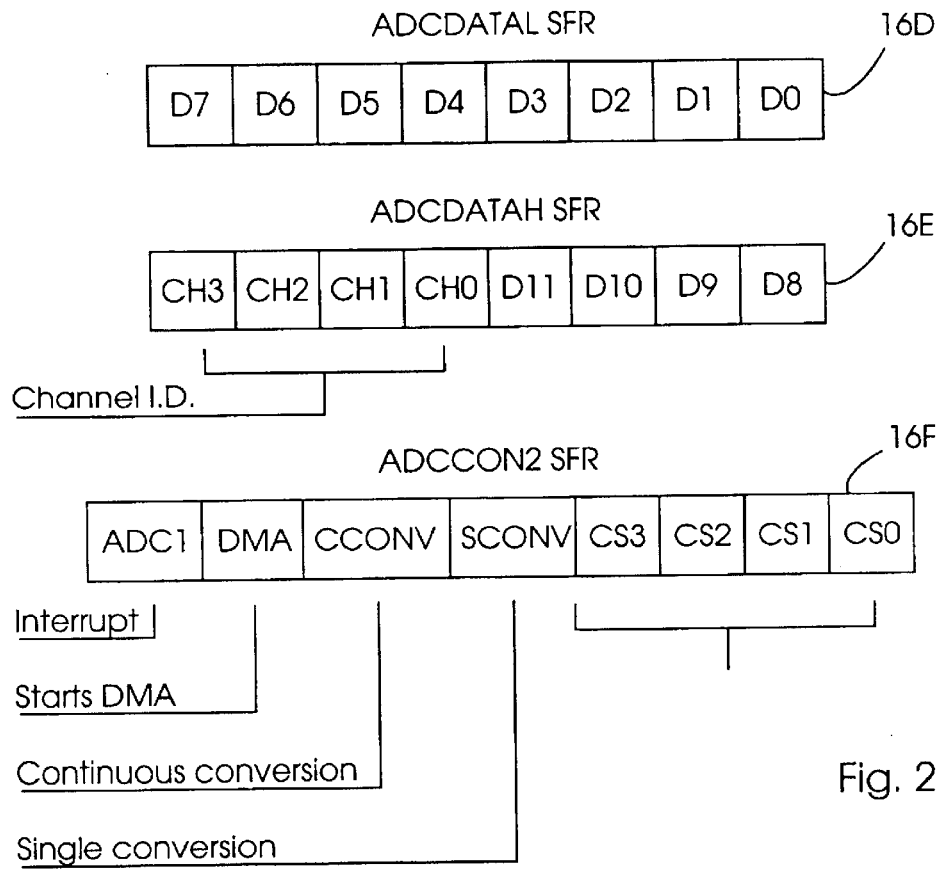
FIG. 2 is a detailed schematic view of three of the registers of FIG. 1.
FIG. 3 shows the relationship between channel select bits an ADC channel selected for conversion.

The three ADC registers 16D, 16E, 16F of the register block are shown in more detail in FIG. 2.

Before entering DMA mode, the microcontroller 24 is programmed to write to external memory specifying the ADC channels to convert. This is achieved by writing for each channel to be converted, a byte containing a 4 bit channel id in its top 4 bits to external memory. Each of these bytes is written to consecutively alternate bytes in external memory. An 'all ones' channel id is used to signify the end of continuous conversion.

FIG. 3 shows the relationship between the channel select bits and the channel which is converted by the ADC.

Figures 4, 5:
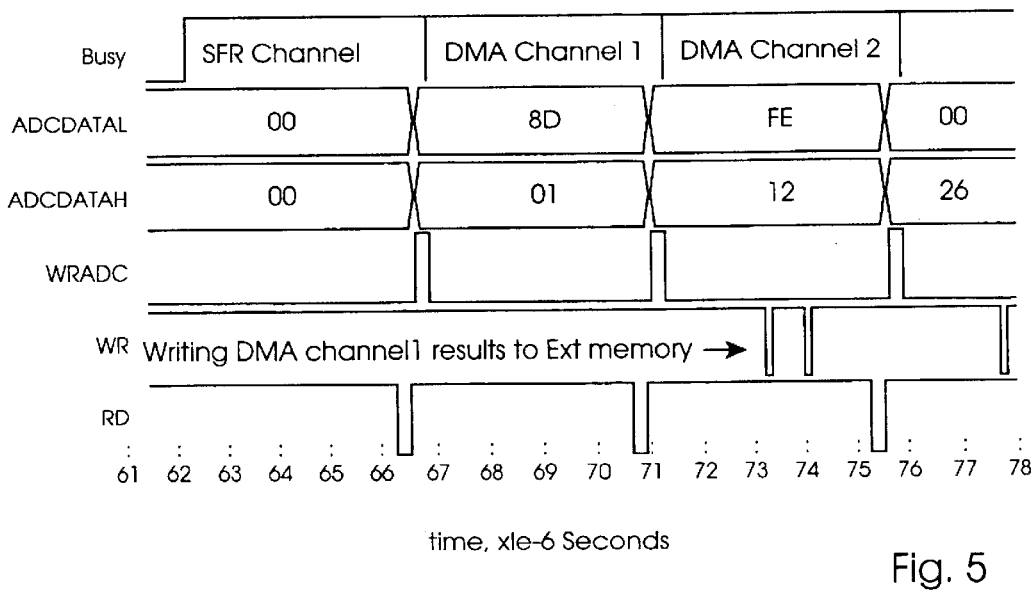
FIG. 4 shows a portion of external memory prior to continuous conversion.
FIG. 5 shows timing signals for three ADC conversions.

With reference to FIG. 4, the external memory is pre-seeded with the channel ids at alternative byte addresses. In the example given, the first address is 402000H. As will be described below, the 12 bit result of the conversion is stored in the remaining bits of that address and in the 8 bits of the subsequent address (402001H). This is achieved by writing two bytes. The first byte contains the channel id and the high four bits of the 12 bit conversion result and the second byte contains the low 8 bits of the conversion result. Thus the channel id is actually overwritten when the conversion result is written to external memory, but it is overwritten with the same channel id that was originally contained in those high 4 bits.

Since the channel id is not corrupted by the DMA operation, if the same sequence of channels is repeatedly to be converted, there is no need for the pre-seeding operation to be performed more than once. All that is required to convert the same sequence again is to reset the DMA SFRs to the start address and to initiate DMA continuous conversion.

Before continuous conversion occurs, the microcontroller is caused to load the start address (402000H in the example) into the SFRs 16A, 16B and 16C and to set the CCONV flag in the ADCCON2 SFR 16F which requests continuous conversion and the DMA bit which starts DMA.

Once DMA mode has been initiated in this way, the microcontroller may continue to execute code without using any processing time to deal with the ADC conversion process. For extremely high precision ADC conversions, it may be desirable to reduce digital noise present on the substrate by putting the microcontroller into an idle mode for the duration of the DMA continuous conversion operation. When the DMA operation is complete, and interrupt is generated by the DMA controller to signal to the microcontroller that the ADC conversion results may now be processed. If the microcontroller is in idle mode when the interrupt is generated, the interrupt has the effect of 'waking up' the microcontroller.

Thus, for example, the microcontroller may initiate a continuous conversion of, say, 4000 values, leave the DMA controller performing the conversions, carry on with housekeeping tasks using internal EEPROM and RAM and then once the conversions are complete, process the results using an FFT for example.

FIG. 5 shows some of the timing signals for the first three conversions once continuous conversion has been initiated.

During continuous conversion, a DMA stat machine is initiated which generates internal and external signals. The external signals which are controlled by the state machine are those present on port 0, port 2 and the ALE, WR and RD signals mentioned above.

It will be noted that the DMA operation is arranged to interleave the memory reading and writing operations of a previous conversion such that these operations occur simultaneously with the next ADC conversion. In this way, no timing overhead is introduced by the DMA mode and therefore the ADC can convert at its maximum rate.

The state machine also generates internal signals 'busy' which is high during ADC conversion, ADCDATAL and ADCDATAH which represents data flowing into the 2 SFRs 16D and 16E and a WRADC signal which causes writing of the conversion result into the SFRs 16D and 16E.

Figure 6:
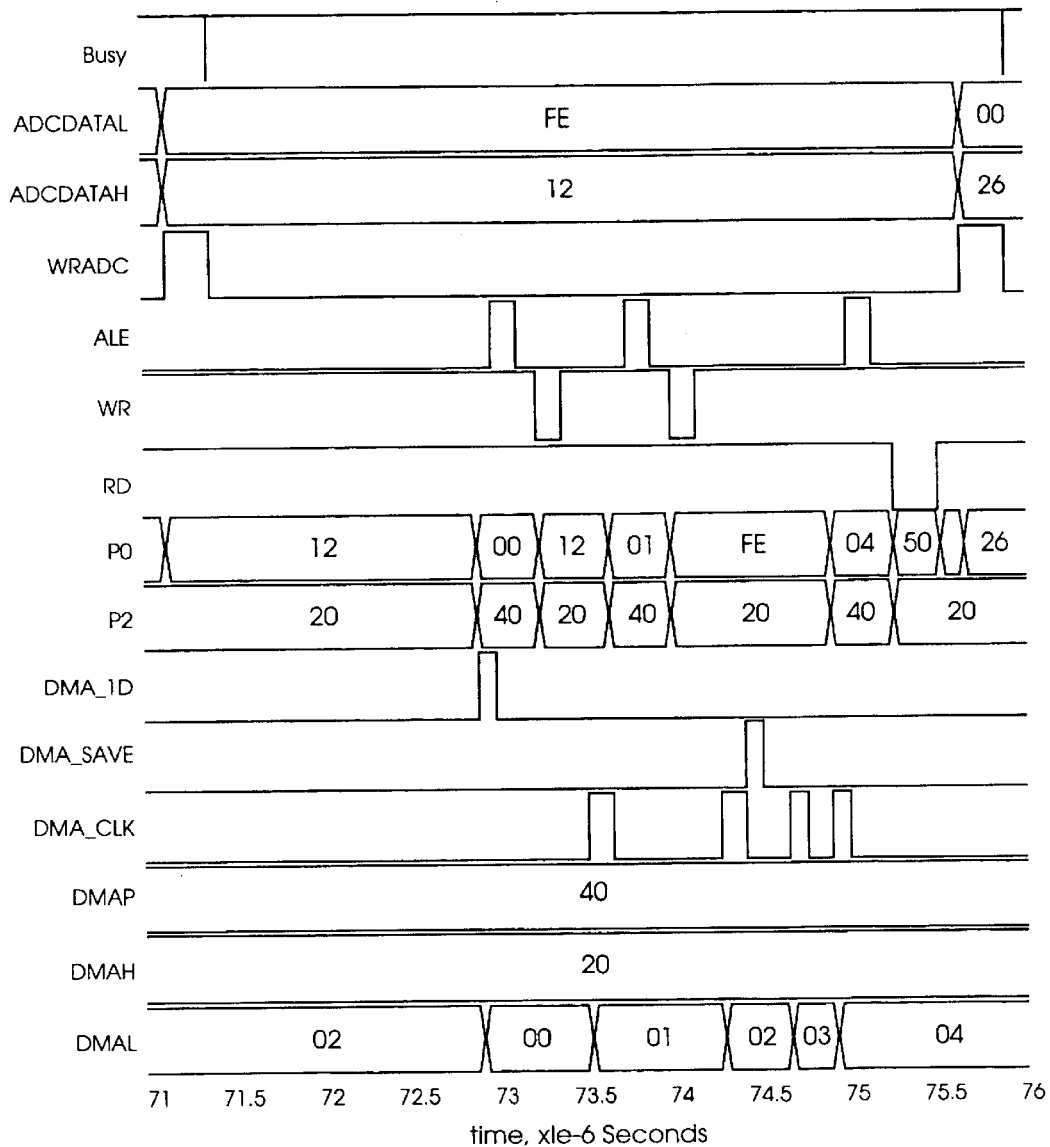
FIG. 6 shows detailed timing signals for one ADC conversion.

FIG. 6 shows the detailed DMA timing for one conversion. The signals are the same as those of FIG. 5 which the addition of 'P0' which represents port 0 and which carries the low address byte or data, 'P2' which represents port 2 and which carries an address high byte or middle byte, a DMA_LD signal which loads the DMA address SFRs (registers 16A to 16C of FIG. 1) with the values of a twenty-four bit latch 30 (previously loaded with earlier values of the DMA SFRs as described below), DMA_CLK which clocks the DMA address SFRs to cause the address stored therein to be incremented by one and a DMA_SAVE signal which causes the present address of the DMA address registers 16A, 16B, 16C to be latched. The address stored in the latches is retrieved using the DMA_LD signal.

As will be seen from FIGS. 5 and 6, during conversion, the previous results are written out to external memory using ALE and WR and the next channel id is read in using ALE and RD. The detailed interaction between the ALE and WR and RD signals is described below.

Since a channel id for the next conversion is read in from the external memory during the present analog-to-digital conversion, the first conversion is performed on the channel specified by the ADCCON2 SFR (register 16F of FIG. 1). The first channel converted is that specified in the 4 bits CS0 to CS3 of FIG. 2. This data is not stored in external data memory and therefore the WR signal is not active until the third conversion. Thus to convert n DMA channels, n+1 conversions are performed.

With particular reference to FIG. 6, it will be seen that the first conversion result is written to memory locations 402000H and 402001H. The channel selected by the channel id from location 402002H is in the process of being converted. The DMA_LD signal loads the DMA SFRs with 402000H. After writing the high byte of the previous conversion result (actually 4 bits of channel id and 4 bits of 12 bit result) the signal DMA_CLK increments the DMA SFRs to 402001. Now the low byte of the previous conversion result is written to external memory. At this point the DMA SFRs are incremented again (to 402002H) and this value is then stored in the DMA save latches using the DMA_SAVE signal. The DMA SFRs now have the value 402002H. The DMA SFRs are then incremented by two addresses (by using the DMA_CLK signal) to allow reading of the next channel id for conversion. When the conversion is complete, the cycle continues with the latched (saved) address being used to write the conversion result back to the address from which the channel id was read.

Thus the sequence of operations after the first three conversions is:

i. commence conversion of channel
ii. load latched address into DMA address SFRs using DMA_LD signal
iii. write high byte of previous conversion result
iv. increment DMA address SFRs by one
v. write low byte of previous conversion result
vi. increment DMA address SFRs by one
vii. save address in DMA address SFRs in latch using DMA_SAVE signal
viii. increment DMA address SFRs by two
ix. read next channel id
x. conversion completes (result in ADCDATA SFRs)
xi. start cycle again When a channel id of all ones is read, the state machine flags an interrupt using the ADCI bit of SFR 16F and clears the DMA and CCONV bits of that register.

FIG. 7 shows the portion of external memory shown in FIG. 4 after continuous conversion has been performed. Thus it will be seen that the memory has been filled with 12 bit conversion results, the remaining 4 bits containing the channel id which identifies the channel which has been converted. It will be noted that the results for the last conversion (in the example, the temperature sensor) are not stored in external memory but remain in the ADCDATAL and ADCDATAH SFRs. These may be caused to be written to external memory by specifying an additional channel id for conversion.

Figure 8:
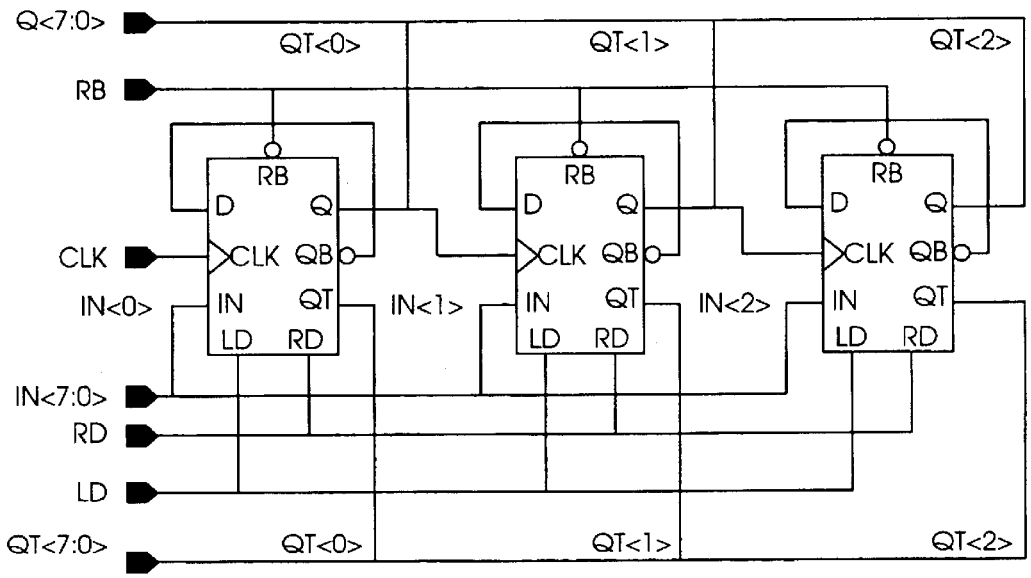
FIG. 8 is a schematic block diagram of one of the DMA SFR's.

FIG. 8 shows 3 bits of an 8 bit DMA SFR configured as a counter. The 3 DMA SFRs together form a 24 bit binary counter which is achieved by connecting the QB output to the D input and the Q output to the CLK input of the next stage. The cell has an RB input which ensures that the cell resets to 0 on power up. All of the outputs of the SFR are connected to a common bus which allows the microcontroller 24 to read the contents of the SFR. The read is achieved using the RD and QT pins. The microcontroller and DMA controller are able to load the SFR with 8 bits of parallel data by activating the LD signal and providing the data on the IN bus.

Figure 9:
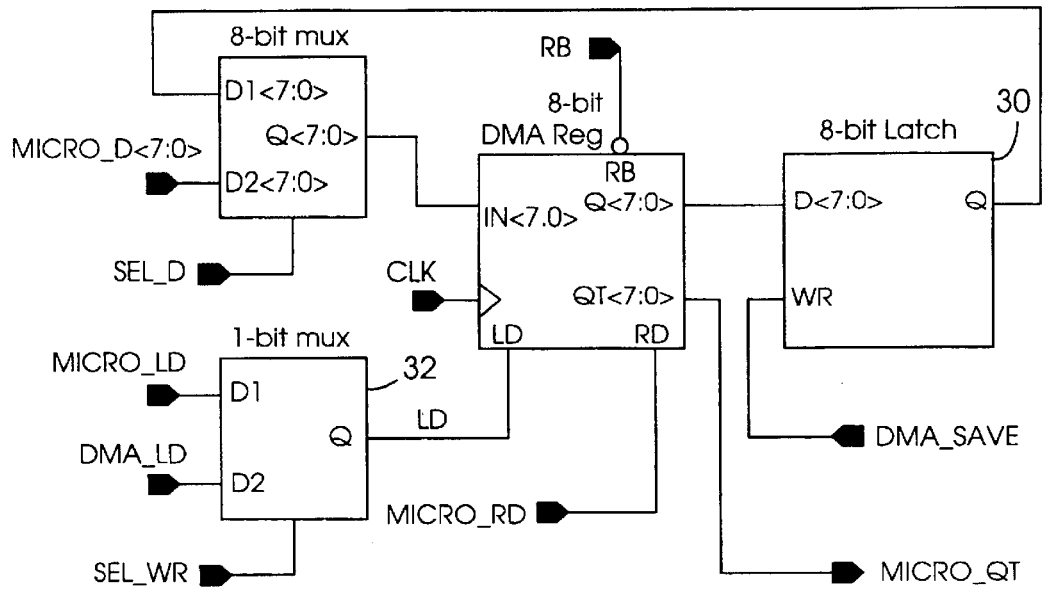
FIG. 9 is a schematic block diagram of the DMA interface.

With reference to FIG. 9, each of the 3 DMA SFRs can be loaded with 9 bit data from one of two sources; either the microcontroller via the micro_D bus or an 8 bit latch 20. This is the latch described above which is used to store the address from which the channel id is read using the DMA_SAVE signal. The LD signal is selected from MICRO_LD and DMA_LD signals as shown in the Figure. The data in the register is saved in the latch 30 when the DMA_SAVE signal goes high. The one bit multiplexer 32 is used to select which id signal is used.

Figure 10:
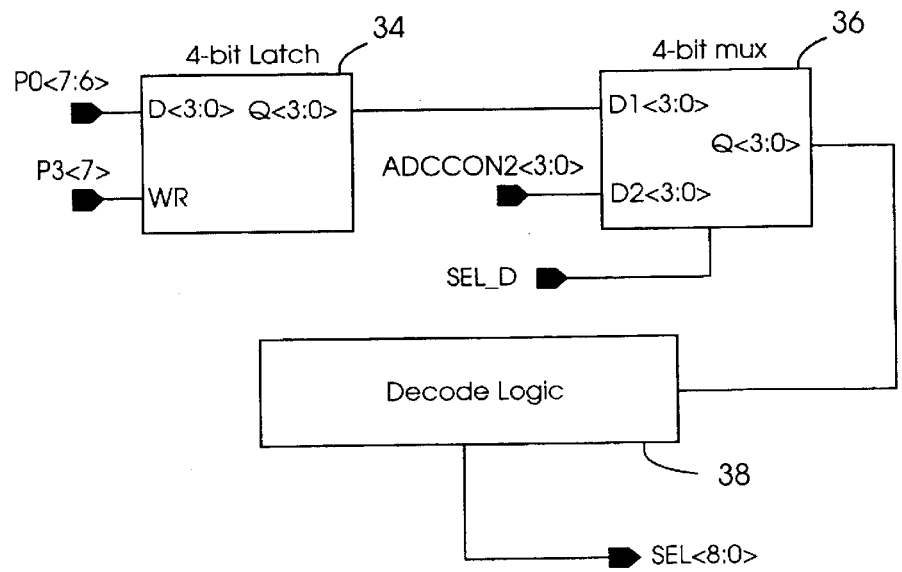
FIG. 10 is a schematic block diagram of channel selection logic.

FIG. 10 shows how channels are selected. The WR signals causes 4 bit latch 34 to latch the channel id from port 0. In non DMA mode, the channel selection is determined by 4 bits stored in the ADCCON2 SFR. In DMA mode, a multiplexer 36 enables the output of the 4 bit latch into decode logic 38 which then decodes the bus to select the appropriate channel for conversion.

Preferably, at least some of the DMA SFRs 16A, 16B, 16C are shared with registers used by the microcontroller 24 as data pointers. In the case of an 8051 compatible microcontroller, the microcontroller has two registers DPL and DPH forming the low and high bytes respectively of a sixteen bit data pointer which is used for accessing external memory. In one preferred embodiment, in DMA mode, the registers DPL and DPH are the same registers as the DMAL and DMAH registers. The addition of the DMAP register increases the address range of the DMA controller from the microcontroller's 16 bit range to a 24 bit range. Alternatively, the three DMA address registers may be separate registers from the DPL and DPH registers. This alterative arrangement allows the microcontroller to be put into an idle mode during DMA operation without disabling the DMA address registers. Either way, it is important, that the microcontroller should not access ports 0 or 2 or the ALE line during DMA since these are driven by the DMA controller (and not the microcontroller core) during DMA operation.

Figure 11:
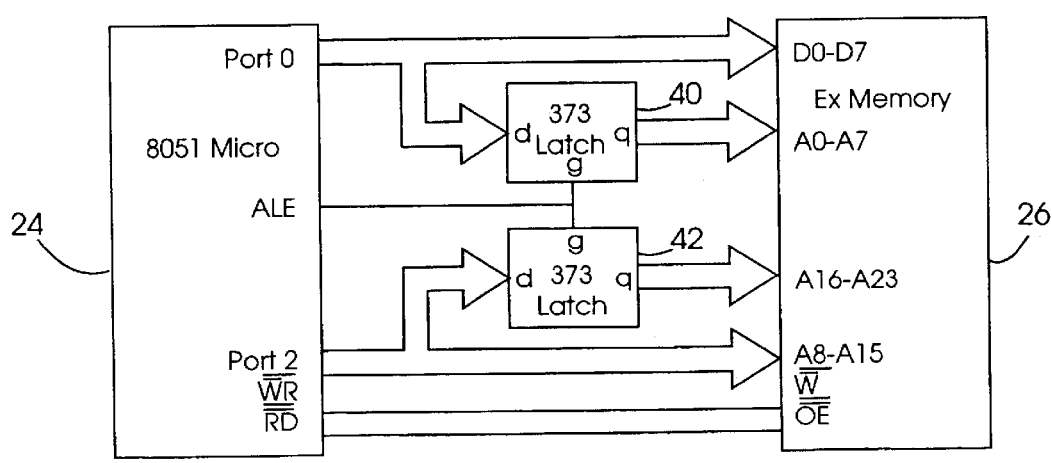
FIG. 11 is a schematic block diagram of the connection between a microcontroller and external memory.

FIG. 11 shows how port 0, port 2 and the ALE, WR and RD signals interact to permit writing and reading to and from external memory. With reference to the Figure, the microcontroller 24 has ports 0 and 2 coupled to external memory 26 and to 8 bit latches 40 and 42 respectively. The outputs of ports 0 and 2 are latched when the ALE signal is active.

Figure 12:
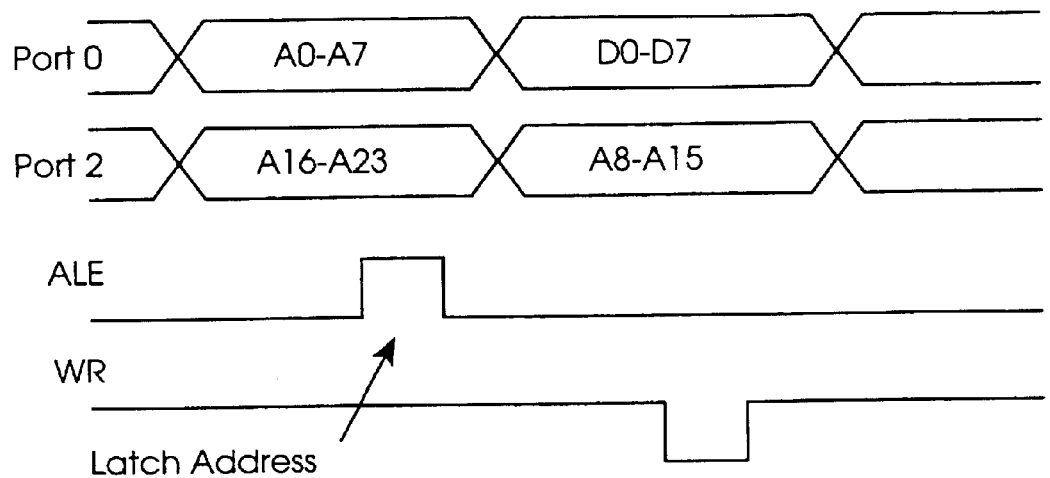
FIG. 12 shows timing signals for a write to external memory.
Figure 13:
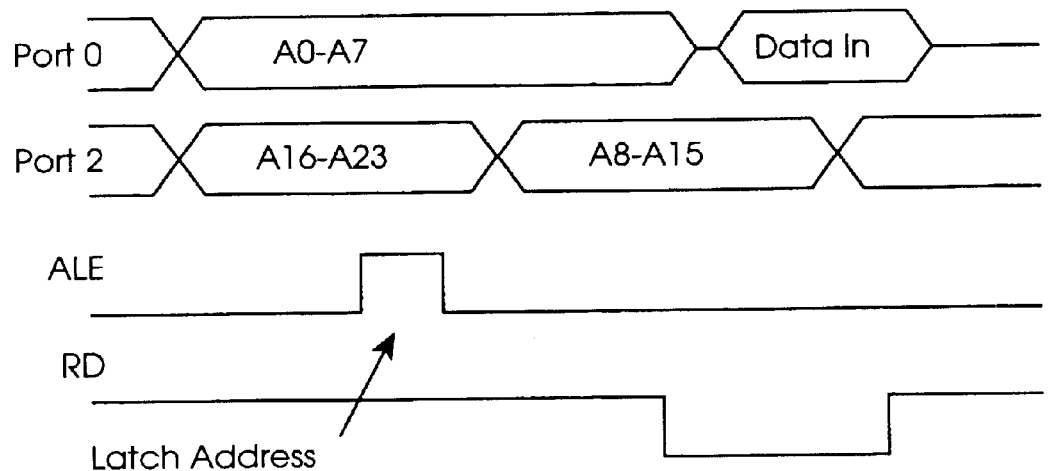
FIG. 13 shows timing signals for a read from external memory.

In this way, port 0 is used to provide multiplexed address (A0 to A7) and data (D0 to D7) and port 2 is used to provide multiplexed addresses (A8 to A15) and (A16 to A23). This allows the microcontroller to address memory using 24 bit addressing using only 8 bit ports. The timing of writing to external data memory and reading from external data memory is shown in FIGS. 12 and 13 respectively. During the first half of the cycle, the low order of the address is provided on port 0 and the high order of address is provided on port 2. These are latched using the signal ALE. The latch holds the data for the duration of the memory cycle. During the second half of the memory cycle, port 2 is used for addresses (A8 to A15) and port 0 is used for the 8 bit data bus. The data is read or written depending on the WR and RD signals.

It will be appreciated that during normal operation, the microcontroller core drives the ALE, WR and RD signals and ports 0 and 2 to achieve 24 bit addressing. In DMA mode, the DMA controller (in the form of the state machine described above) is responsible for generating the necessary signals on these lines and ports to achieve writing and reading in a 24 bit address space. In each case, the timing is as shown in FIGS. 12 and 13.

If only 16 bit addressing is desired, the latch 42 may be omitted. No other changes are required. This is possible because it has been chosen to output the high 8 address bits (A16–23) in the first half of the cycle. Thus when WR or RD become active (towards the end of the second half of the cycle), it is the values A8–15 which are available on port 2. Since WR or RD are not active in the first half of the cycle, any data output on port 2 and not latched) is ignored by any memory-mapped devices such as external memory.

Calibration

The ADC described above may be designed in accordance with the teachings of commonly assigned U.S. Pat. No. 5,621,409, filed 15 Feb. 1995, application Ser. No. 08/235,087, filed 29 Apr. 1994 and application Ser. No. 08/274,169, filed 18 Jan. 1995 which are incorporated herein by reference. Briefly, these documents disclose an ADC with multiple charge balance conversions and having a calibration facility.

Figure 30:
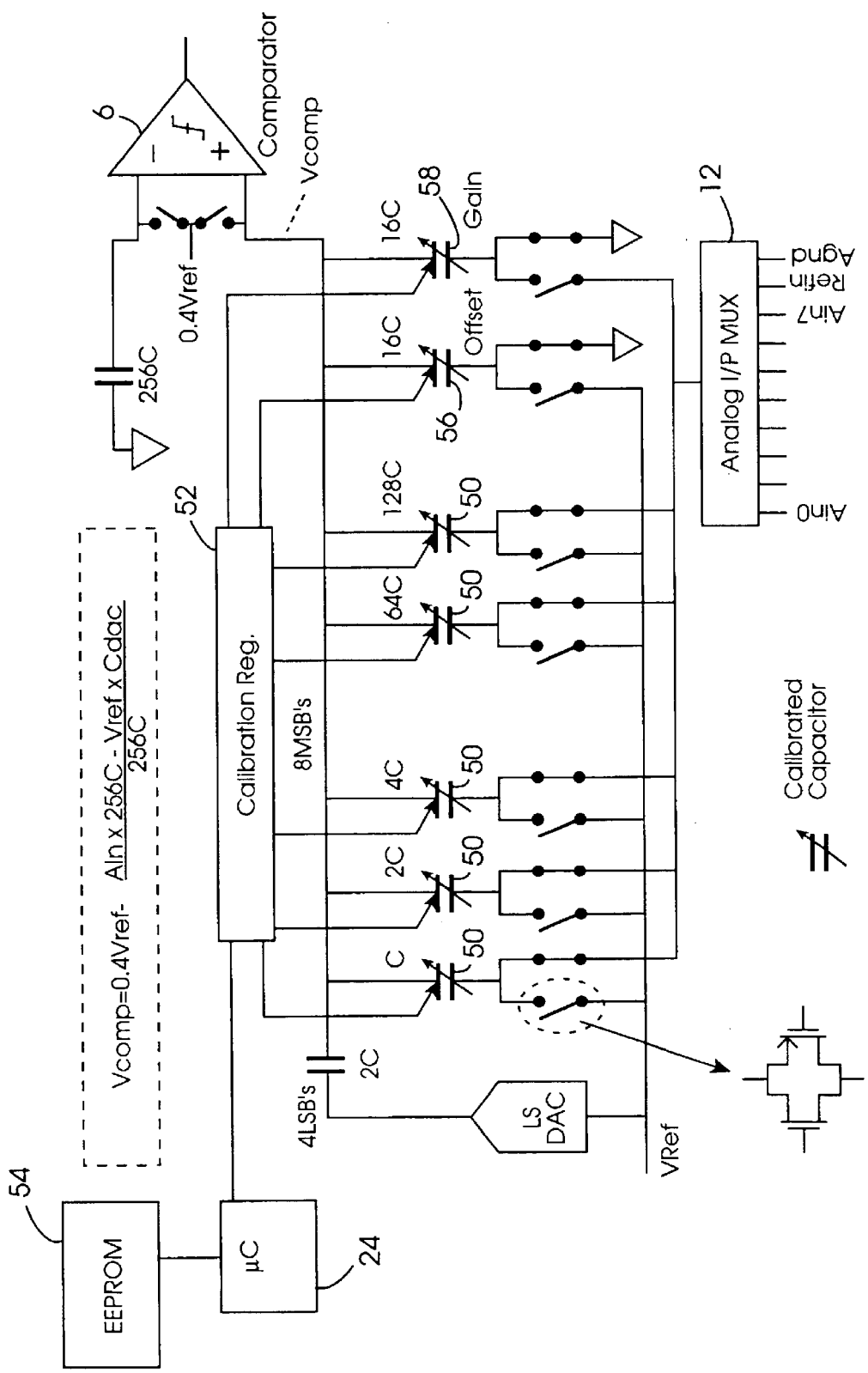
FIG. 30 schematically illustrates the SAR DAC portion of the ADC.

A schematic view of the successive approximation (SAR) DAC portion of the ADC is shown in FIG. 30. With reference to that figure, the eight MSBs are calibratible using calibratible capacitances 50. The capacitances are arranged as a binary trim array. The calibration value of each of those capacitances is adjusted according to digital values loaded from a calibration register 52. The register is constructed using a RAM register which may for example be constructed using D-type flip flop for each capacitance 50. The D input of each flip flop would be connected to the microcontroller 24 and each Q output would be connected to a respective calibratible capacitance 50.

The microcontroller 24 may read factory or in situ values from the EEPROM block 54 and write these to the register 52 for adjusting the calibration coefficients of the DAC portion of the ADC (thereby changing the calibration of the ADC). The ADC may be calibrated for accuracy or even to implement a non-linear characteristic perhaps to linearise a non-linear transducer.

Similarly the offset and gain of the ADC may be adjusted using calibratible capacitances 56, 58. In the preferred embodiment, these capacitances have a value of 16C (arranged as a plus or minus 8C adjustment). The whole array has a value of 256C and thus an adjustment of gain and/or offset of over 3% is available. In this way, the offset of transducers may be nulled out and/or an analogue multiplication may be applied to any input analogue values. This can obviate the need for any separate hardware or software multiplication or manipulation of the results with consequent cost and time savings.

In the preferred embodiment, the 4LSBs are not calibratible and a scaling capacitance 56 is used to scale the two segments together.

Typically, the calibration coefficients are loaded into the register 52 during the execution of a power-up loader in bootstrap memory.

Typically, the ADC is calibrated in the factory and the resulting coefficients loaded into the EEPROM 54. However, since the non-volatile memory is reprogrammable under control of the microcontroller (as described elsewhere in the present application), the user has complete freedom to adjust the performance/characteristics of the ADC and to store the chosen settings for future use in non-volatile memory. The freedom to adjust is provided by the ability of the microcontroller to write to the read/write RAM register 52.

As a further enhancement, the microcontroller may load a different set of calibration coefficients into the register 52 for different conversion channels so that the ADC operates in a different way depending on which channel is being converted. This allows for example, for different transducers to be linearised in different ways. This may alternatively be implemented in hardware using a register having more than one set of coefficients and which can be commanded to load those different sets into the ADC either by the microcontroller or based on the selected channel.

This ability to change the calibration data with the circuit in situ and without any additional external components or even physical contact with the circuit is particularly useful for applications where the ADC is inaccessible, for example in a hostile environment such as a chimney stack.

Figure 32:
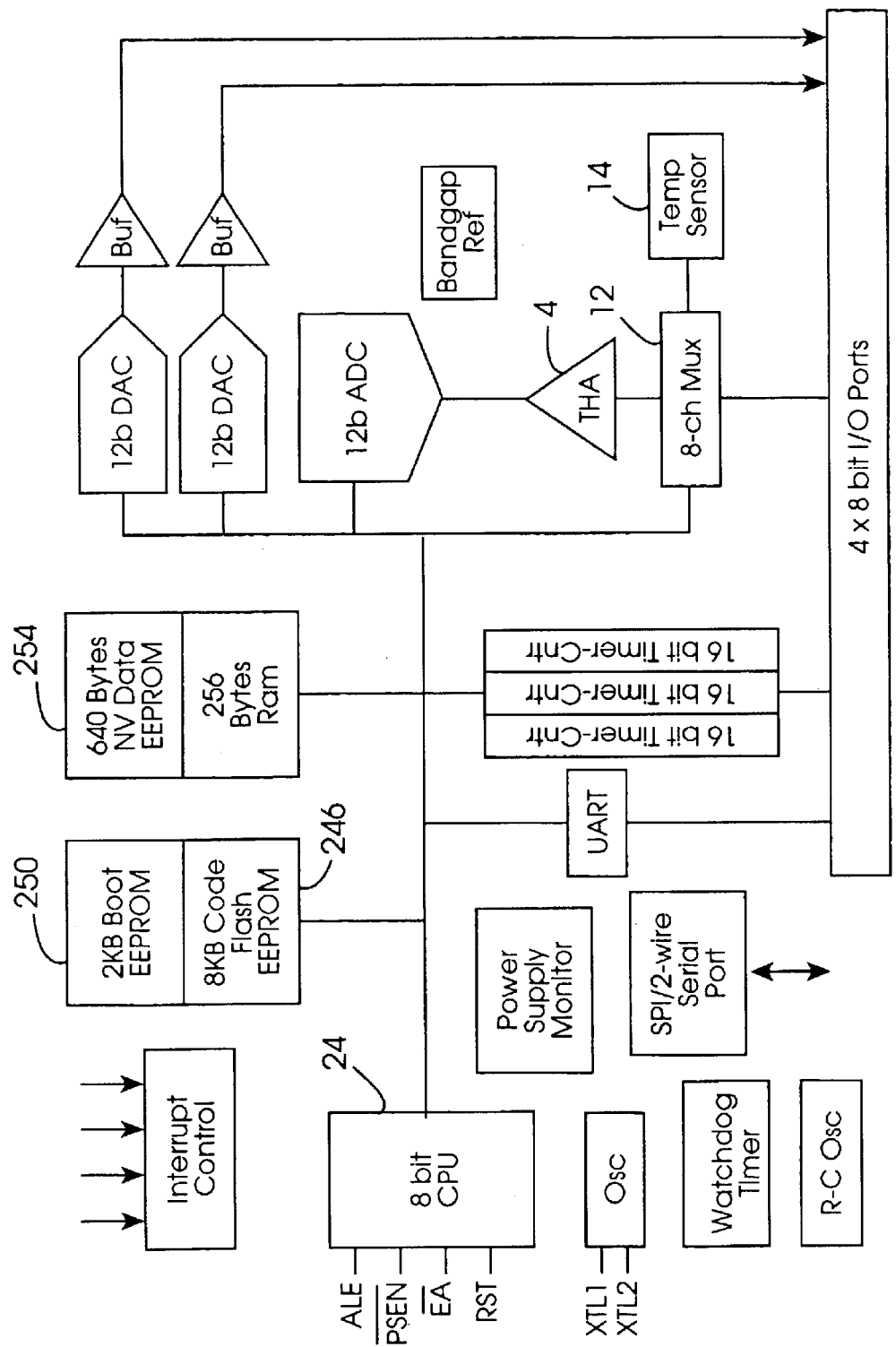
FIG. 32 schematically illustrates the complete integrated circuit.

The two DACs shown in FIG. 32 may also be calibrated in a similar way to that of the DAC described above. The current source DAC may have a calibratible array of current sources.

Emulator

Figure 14:
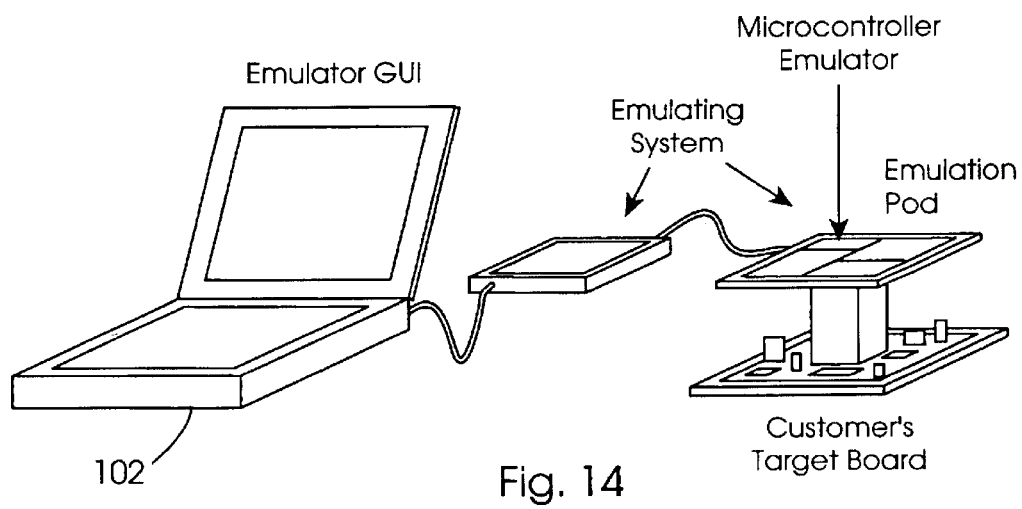
FIG. 14 schematically illustrates a prior art emulator arrangement.

FIG. 14 schematically illustrates a prior art emulator in which a large emulation pod plugs into the data processor socket on a customer's target board in order to provide interconnection with an emulator system comprising an emulation control processor running an emulator software package which typically displays register contents of the target processor and allows for editing of instructions via a graphical user interface (GUI). The large size of the emulation pod makes it inconvenient to use and also can give rise to subtle changes in operation of the target board due to the extra load and parasitic components introduced by the emulation pod. Furthermore, the known emulation pod uses a different or modified data processor which gives rise to changes in output driver characteristics and loadings which can affect signal timings and degrade analog performance where analog circuits or DACs or ADCs are involved.

Figure 15:
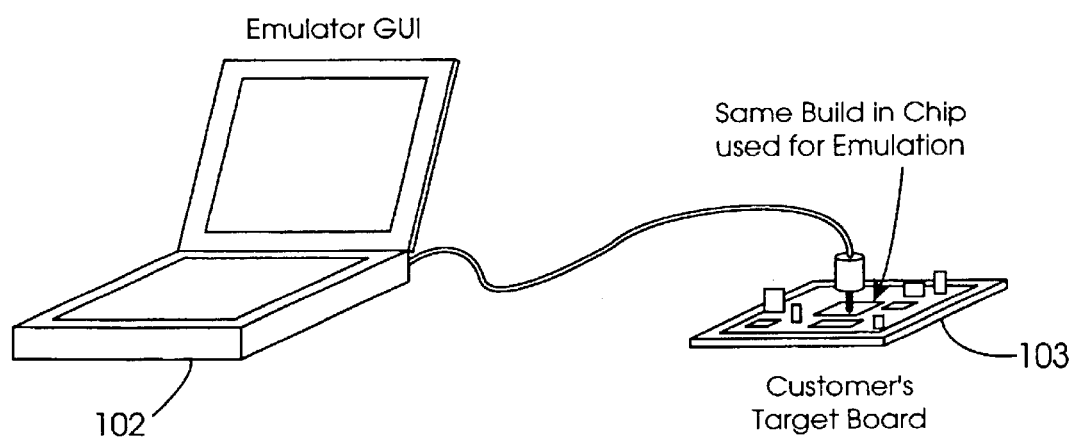
FIG. 15 schematically illustrates an emulator constituting an embodiment of the present invention.

As shown in FIG. 15, an emulation system comprising a data processor constituting an embodiment of the present invention and an interface card 103 for providing galvanic isolation between the customer's target board and the emulation control data processor 102 provides for a more compact emulation system and, more importantly does not change the operating characteristics of the customer's target board due to the introduction of parasitic components.

Figures 16A, 16B:
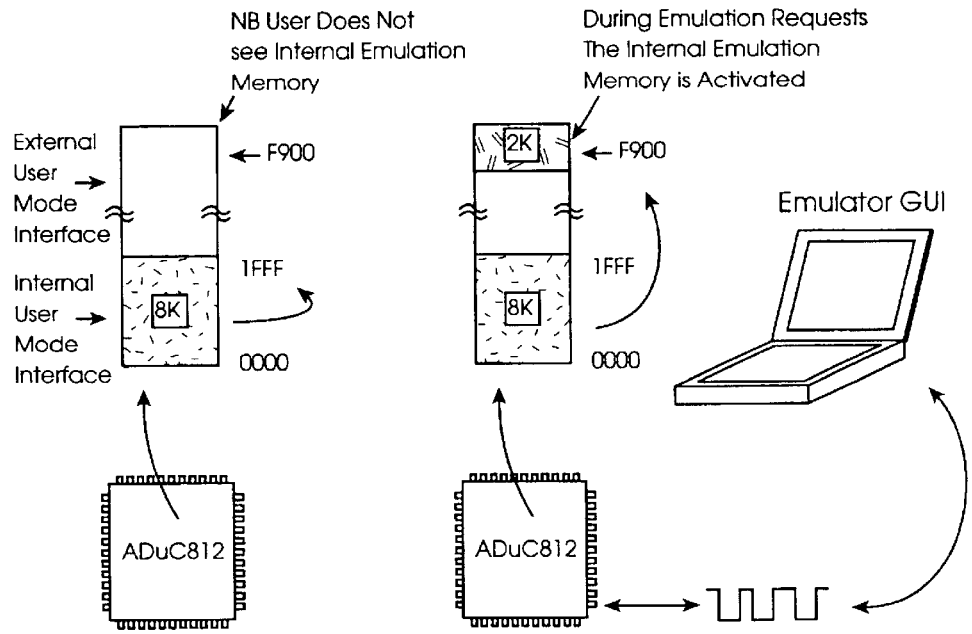
FIGS. 16a and 16b schematically illustrate the memory organization within a data processor constituting an embodiment of the present invention in normal operation and in emulation mode, respectively.

The data processor having an emulator according to the present invention performs emulation under software control. In order to achieve this a reserved memory containing emulation instructions is provided as an integral part of the data processor. As shown in FIG. 16a, a data processor may have, for example, a memory space in which addresses 0000H to 1FFFH (where "H" indicates that the addresses are expressed in hexadecimal) are provided for internal user program code and the addresses 2000H to FFFFH are allocated to external user code space. Addresses above F900H are reserved for an emulation memory which is not visible to the user. The emulation memory is placed on another page of memory such that it remains hidden from the user. Thus, for example, external memory addresses F900H to FFFFH may contain a user program, whereas internal addresses F900H and above contain the emulation program.

Figure 17:
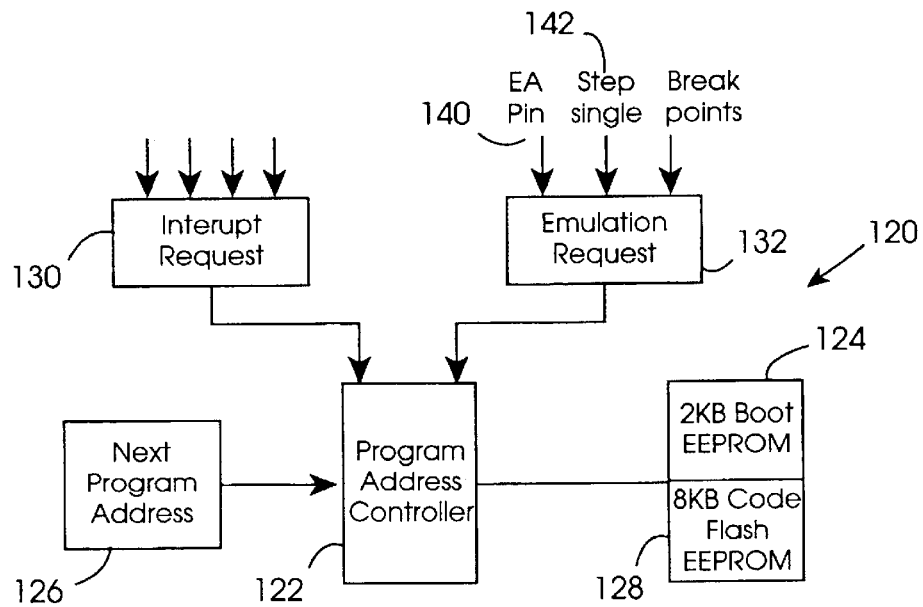
FIG. 17 schematically illustrates the internal layout of a microcontroller constituting an embodiment of the present invention.

FIG. 17 schematically illustrates the internal arrangement of a data processor, generally illustrated as 120, whereby a program address controller 122 holds the address of the next memory location to be read from. This location normally points to a boot strap memory 124 which contains executable code to be used during power up sequences or for data exchange routines, or to a user program 126 which may be stored in an internal user code memory 128 or in external memory (not shown). The program address controller 122 is responsive to an interrupt request handler 130 which, as is well known in the art, allows normal execution of a program to be interrupted in order to respond in a predetermined way to specific events. The data processor is arranged to execute an interrupt routine in response to an interrupt request and then to return to the user code when the interrupt routine has been completed. The data processor constituting an embodiment of the present invention is also provided with an emulation request controller 132 which issues a priority non-maskable interrupt request which takes precedence over all other interrupt functions. The interrupt controller 130 is arranged to buffer incoming interrupts while the program address controller is responsive to the emulation request controller 132 in order to ensure that interrupt requests are properly serviced upon return from the emulation mode.

The emulation request controller is responsive to three inputs. A first input is responsive to a voltage transition on a single pin of the data processor package. In the preferred embodiment, the pin is a "EA" pin which is used to tell the data processor and it should execute from internal (EA= high) or external (EA=low) memory during the power up. The state of the pin is latched by the data processor at power up or reset and thereafter it can be used as the emulation control pin. The EA pin is also used, when emulation has been initiated, as a bi-directional serial communications pin.

The emulation request controller is also responsive to a single step flag 42 which ensures that an emulation request occurs after execution of a single instruction of the user program code. Preferably, the emulation controller 132 is responsive to a break point instruction whose occurrence in the user code causes the emulation controller 132 to issue an emulation request.

Figure 18:
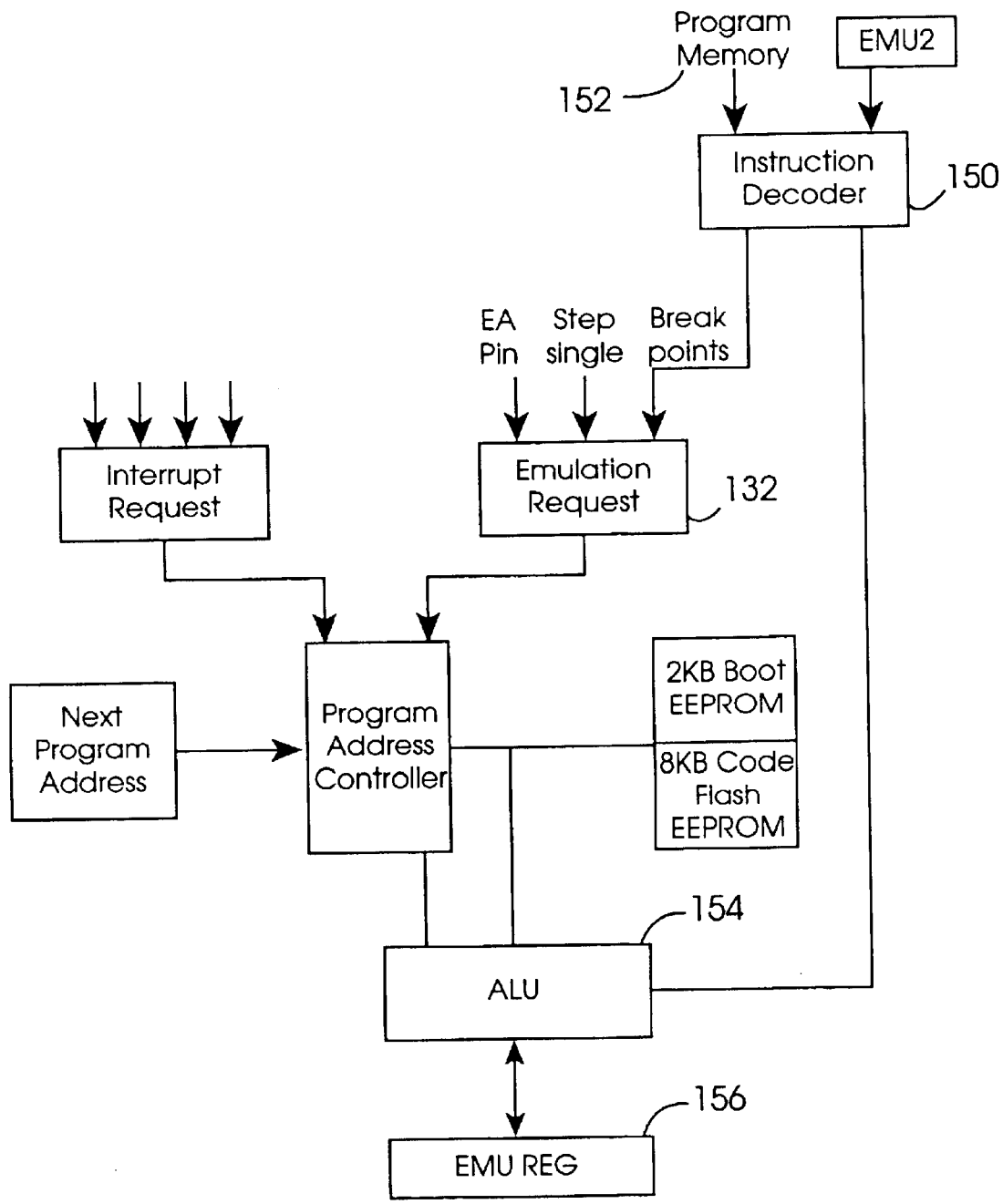
FIG. 18 schematically illustrates the internal layout of a microcontroller constituting a further embodiment of the present invention.

As shown in FIG. 18, a break point instruction decoder 150 is provided to specifically handle the occurrence of the additional single byte emulation instruction (break point instruction) contained within user program memory 152, which may be external memory or, more likely, internal memory area 128. Additionally, a special register EMU2 is provided to hold the instruction which was overwritten by the emulation request instruction thereby ensuring that the addresses of the remaining program code are unaltered. As shown in FIG. 18, the data processing core 154 (also known as an arithmetic logic unit ALU) has a dedicated set of reserved registers 156, EMUCON, EMU1 and EMU2, for use during emulation. The reserved register set may also include an alternative stack and/or program counter for use during emulation.

FIG. 21 illustrates the emulation control register, EMUCON, provided within a data processor including an embedded software controlled emulator. Working from the left to right, the first three bits of the register form a control word which causes internal timers and clocks of the data processor to be disabled if the correct code, in this example 101, is written into these bits of this special function register. This enables the emulator to halt internal timers and interrupts when executing an emulation function. The fourth bit is an emulation enable bit, EE, which is placed in the enable condition by default and enables emulation to be started when an appropriate emulation request is received by the emulation request controller. The fifth bit enables execution of the contents of the special function register EMU2. When an emulation routine is started by the occurrence of the emulation break point in the user program code, this EES register is inspected in order to determine whether the break point instruction should actually be executed. If the contents of this register are not set, then the emulation will be performed. When the emulation routine is completed, the address pointer points to the address of the break point. As mentioned earlier, the original instruction which was overwritten by the break point is loaded into the EMU2 special function register and the bit EES is cleared. As the emulation program returns control to user code, it sets the EES bit. The address program counter will return control at the address of the break point instruction. However, this time the EES bit is set and instead of re-executing the emulation routine, the processing core of the data processor is caused to execute the instruction held in the EMU2 special function register. The EES bit is then toggled once the instruction in the EMU2 register is executed, thereby ensuring that the next occurrence of the break point instruction will cause the emulation routine to be re-entered.

The sixth bit is an emulation single step, ESS bit which causes the data processor to only execute single instructions between emulator program operations.

The final two bits EA-in and EA-out enable the status of the EA pin to be read and written to respectively.

FIGS. 19a to 19d schematically illustrate operation of the emulator in a single step code execution mode. The emulation routine takes advantage of the fact that the emulation interrupt will not respond until at least one instruction of the user code has been executed. Thus once control has been passed from the emulator to the user code, the emulator issues, via a hardware resource, a highest priority non-maskable interrupt that ensures that program execution is immediately returned to the emulator, irrespective of what instruction was being performed.

Figure 19:
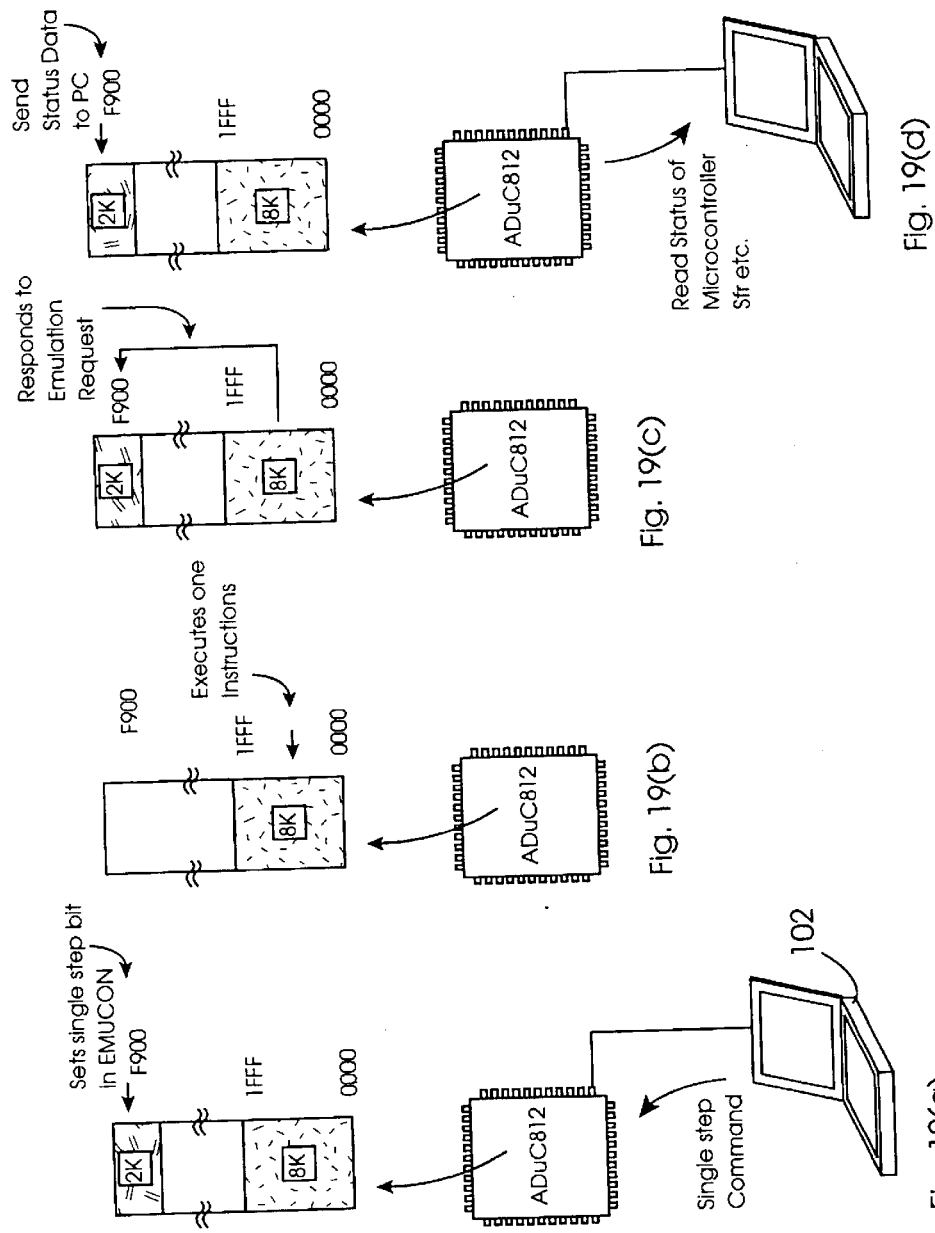
FIGS. 19a to 19d schematically illustrate an emulation in a single step mode.

Thus as shown in FIG. 19a, the emulation control data processor is arranged to issue an emulation request via the EA pin which causes a jump to the emulation memory. This initially allows communication between the emulation control data processor 102 and the emulator in order that new instructions can be set in the emulator, such as changing one or more of the flags in the EMUCON register, in this example, the control data processor sets the single step instruction, ESS, flag in the EMUCON register. Once the emulation control data processor has indicated that it does not wish to set any further instruction changes, control is relinquished from the emulation code and the user code is executed. However, since the EMUCON register was set with the single step enabled, and interrupt request is issued via the emulation controller 132 thereby causing control to be returned to the emulation code after a single instruction of the user code has been executed as shown in FIG. 19c. The emulation code then down loads data to the emulation control data processor 102 via the EA pin. Down loaded data may include the status of the internal registers of the data processor, but may also, depending on instructions received from the emulation control data processor, include the contents of the stack and also the contents of selected areas of internal or external memory, or the contents of an internal cache.

FIG. 20 illustrates an example of an emulation request initiated via the bread point instruction.

The data processor has a data processing core supporting the 8051 instruction set. The 8051 instruction set has a unused instruction code of A5. The A5 instruction has been implemented as the break point instruction.

It is known to initiate a software emulation or debug by including a jump instruction to the emulation code. However there is a significant problem with this approach since the jump instruction is a 3 byte instruction and if this was inserted at address 0120, as shown in FIG. 20 then the inc A and DAA instructions at addresses 0121 and 0122, respectively, would be overwritten by the jump instruction. Thus it would be necessary to change the addresses of the subsequent steps in order to incorporate the addition of this jump driven emulation instruction. Secondly, in order to use this approach, the emulation memory/program must be visible for the jump to work and consequently the incorporation of the emulation code within the data processor would limit the user's programing options. A third problem is that, if the addresses of all the remaining code were not changed, it would result in the instructions at 0121 and 0122 being lost, and also an additional breakpoint could not be inserted at the overwritten addresses.

By adding a single byte break point instruction, only one address of program is over written. Thus in the example in FIG. 20 only the "clear A" instruction at 0120 is overwritten by the inclusion of the software driven emulation break point instruction. However, the clear A instruction is written into the EMU2 register in order to ensure that it is executed as if the break point instruction were not there. If a breakpoint instruction is to be written into the user code for debugging/development purposes, the emulator reads out a block of memory containing the program code containing the address of the instruction to be changed. An internal memory controller (described elsewhere in the present application) then erases the block of memory, and in cooperation with the emulation control data processor, reprograms the block of memory adding the breakpoint instruction.

The interface element 103 may provide a local buffer such that as the block of program code (usually two rows of the internal non-volatile reprogrammable user code memory of the data processor), is buffered in the interface element and the local data processor modifies he data to change instructions or insert the breakpoint, and then represents the data to the target data processor in order that it can rewrite the data into its internal memory.

During execution of the user program, the program counter will eventually point to the address 0120 which has the A5 emulation break point instruction written therein in place of the "clear A" instruction. The instruction decoder of the data processor decodes the break point instruction and causes the emulation request controller 132 to issue a priority interrupt. Thus the data processing core 154 discontinues execution of the user's program and starts executing instructions from the emulation memory provided that the EEs bit in the EMUCON register cleared. Assuming that the EES bit is cleared, the data processing core executes the emulation instructions using the reserved EMU1 register, and outputs data concerning the status of the various program registers to the emulation data processor 102. Once the data has been sent to the emulation data processor, the emulation data processor toggles the EES bit and issues a command causing the emulation to continue. The emulator then returns control to the user program. Because the break point instruction is interrupt driven, the control is returned to address 0120 which holds the A5 break point instruction. This time the EES bit indicates that emulation should not be recommenced, but in fact that the instruction in the EMU2 register should be executed. The data processing core executes the instruction in the EMU2 register and returns control to the user program at the address following the break point instruction.

Figure 31:
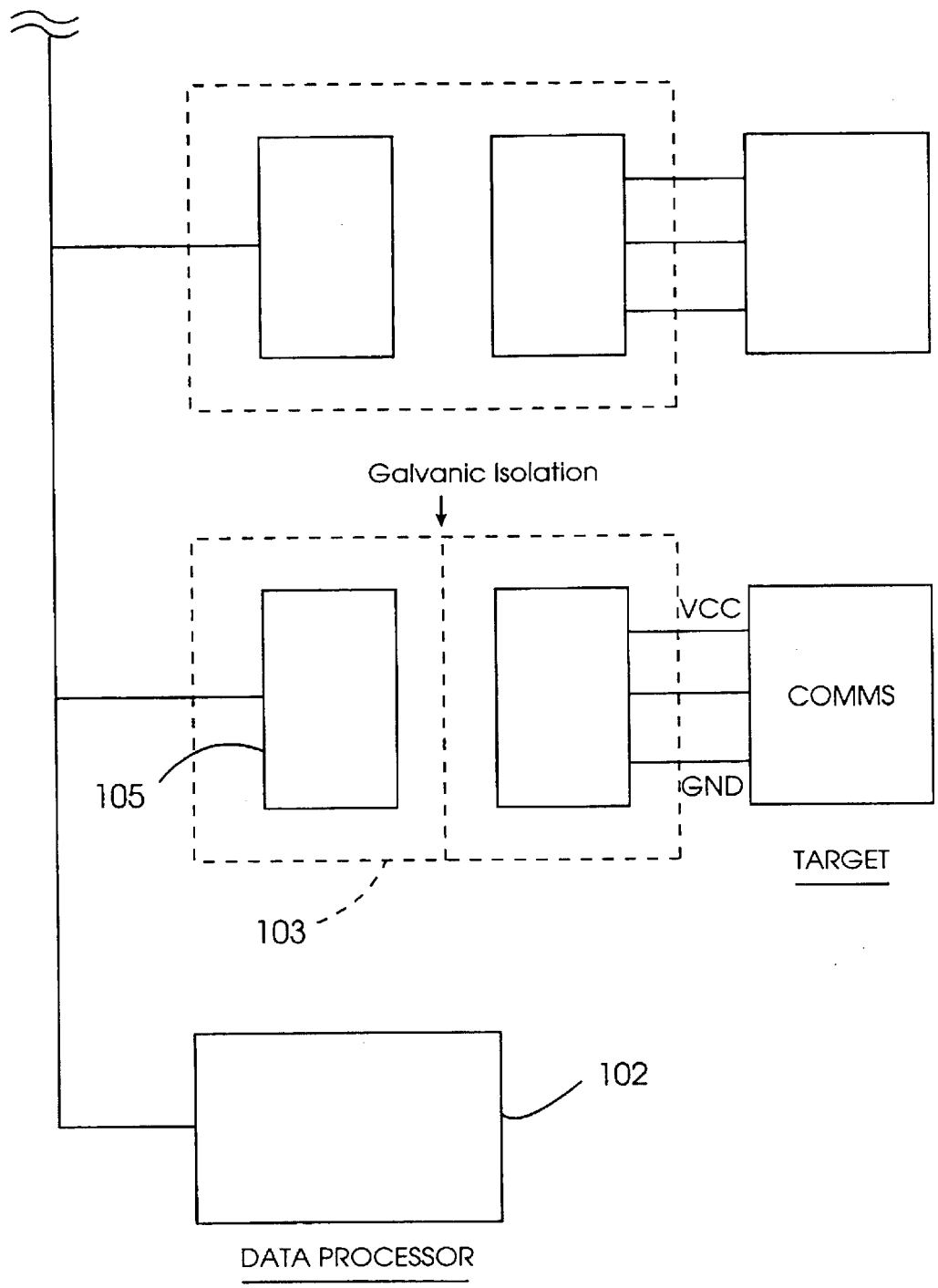
FIG. 31 schematically illustrates the emulation system.

FIG. 31 schematically illustrates a multi target development system in which a single control data processor 102 communicates with a plurality of target data processor via a plurality of interface elements 103, each of which contain a local data processor 105 of the type described elsewhere in the present application which reduces the computational load on the control data processor by performing the communications protocols and also buffers and modifies data in the target data processors in response to commands from the emulation control data processor 102.

It is thus possible to provide a data processor having a software driven emulator embedded therein which uses dedicated registers, thereby ensuring that registers used in execution of a user's program do not become altered once the emulation mode is commenced. It is also possible to provide a development system for use with such a microprocessor in order that the internal registers may be inspected, or blocks of memory may be inspected and analysis performed thereon.

For example, a block of memory may hold values resulting from analogue to digital conversions. These typically are placed in memory using the continuous conversion DMA technique described above.

The magnitude of the values may be displayed by the emulation control data processor in order to form an oscilloscope trace of the analogue channel or channels sampled by the ADC, or additionally or alternatively may be Fourier transformed in order to perform frequency domain analysis. As a further enhancement, the emulation control data processor may take account of the channel ids stored in the memory block to provide a multi-channel oscilloscope-type display with one channel of the display representing a respective conversion channel. Similarly, X, Y and Z inputs of a conventional oscilloscope may be simulated and mapped to different conversion channels based on the channel ids stored in the memory block.

The emulator may display a plurality of windows, with each displaying the status of and/or controlling the function of a respective target data processor within a multi processor target board. Thus the operation of master and slave processors may be analyzed, possibly on a single step bases, in order to check their data exchange operation and mutual performance.

The emulator has authority to modify the internal memory contents of program and data memory within the target data processor. Thus the target data processor may be re-programmed whilst it is in situ in the target board making use of its self re-programming capability. Similarly, calibration coefficients in digital or hybrid-analogue systems may be modified as described elsewhere in the present specification. It is also possible, when the interface element communicates using a radiative link, to leave the interface element attached to the target board permanently, thereby allowing for the target data processor to be reprogrammed even after it has been installed in a working environment. The provision of an emulator as an integral part of the target data processor has the additional advantage that the board and processor being debugged/developed are identical to the final system. This contrasts with prior art emulators of the type shown in FIG. 14 whereby the data processor on the emulation pod synthesizes the functions of the target data processor but is often a physically different type of processor which may have additional hardware attached thereto to simulate the ports of the target data processor.

Memory

Figure 22:
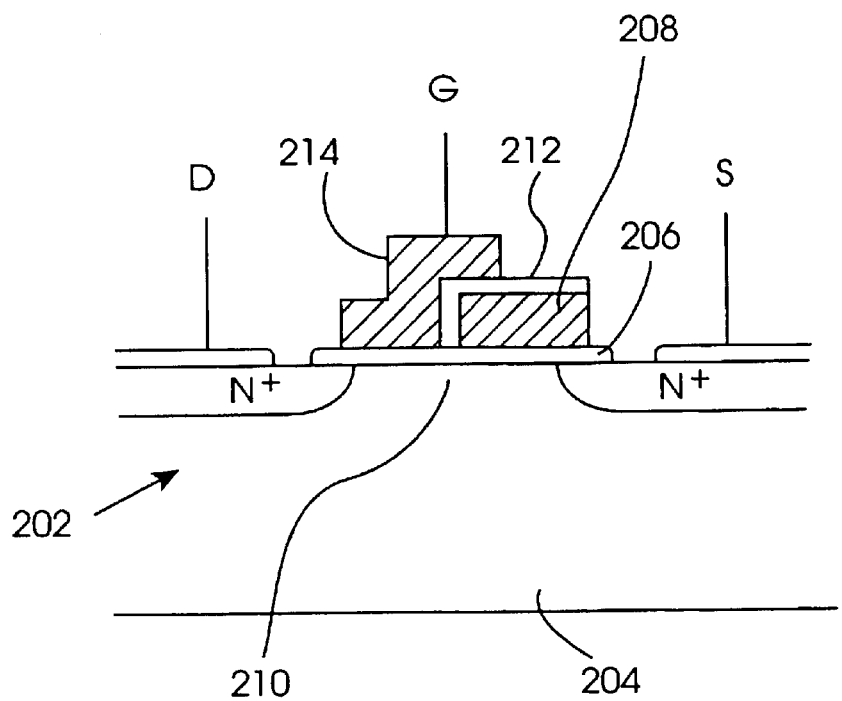
FIG. 22 is a schematic view of a memory cell of a flash EEPROM.

U.S. Pat. No. 5,242,848 describes a floating gate memory cell and a method for making such a cell. The memory cell described therein is of the type used in the preferred embodiment of the present invention and the teachings of U.S. Pat. No. 5,242,848 are incorporated herein by reference. Briefly, each memory cell, as shown in FIG. 22, comprises a field effect transistor 202 having a drain D and a source S formed by N-type doping of a P-type silicon substrate 204. An insulating layer 206, for example silicon dioxide is deposited over the substrate, and a polysilicon floating gate 208 is formed over a portion of a channel region 210 of the transistor. The floating gate 208 is offset to one side of the channel 210. An insulating layer 212 is then deposited over the floating gate 208 and then a second gate electrode 214 is fabricated. The gate connection G is made to this second electrode. The dimensions of the memory cell must be chosen such that electrons emanating from the source region can be injected onto the floating gate 208. Furthermore, charges must be removable from the floating gate 208 by a tunneling mechanism to the control gate.

Figure 24A:
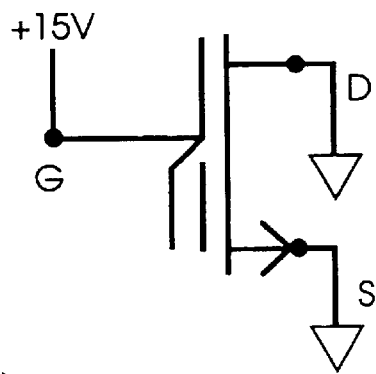
FIGS. 24a, 24b and 24c show the electrical conditions for erasing, writing and reading a memory cell, respectively.

In order to erase memory cells of this type, the drain D and source S regions are connected to ground and the gate electrode taken to a relatively high voltage, say around +15 volts, as shown in FIG. 24a. In the memory described in U.S. Pat. No. 5,242,848, all the cells have a common source. The gate terminals are attached to the row lines and the drain terminals are attached to the column lines. Thus the memory is arranged such that the minimum erase size is one row, and the number of rows that are erased is controlled by the row address decoder. In the erased state the transistors are conducting.

Figure 23:
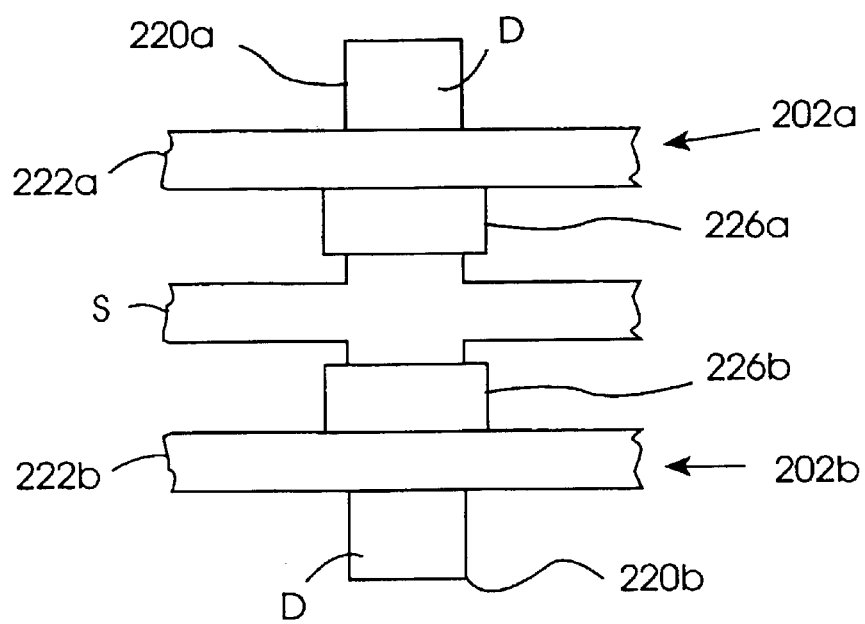
FIG. 23 is a plan view of memory cells in a single column and in adjacent rows sharing a common source.

The physical space occupied by the memory can be reduced if adjacent rows of memory share a common source conductor. As shown in FIG. 23, adjacent transistors 202a and 202b have respective drain connections 220a and 220b but share a source conductor. Each transistor has a respective gate electrode 222a and 222b. The floating gate structures are diagrammatically represented as areas 226a and 226b. Each row can be erased and written independently, but the other row of the pair would see a "disturb", i.e. a voltage transient outside of the normal supply rail voltage (0 and Vcc) which could affect the longevity of the data retention period. If only one of the rows was repeatedly erased and rewritten the accumulation of disturb pulses could cause the data in the other row to become corrupted. The user might then perceive the device as being faulty even though it is actually still working correctly. This potential problem is overcome by configuring a memory controller to cause both rows of the pair to be erased simultaneously, thereby giving a minimum erase sector of two rows. Thus during an erase cycle, the shared source S and the respective drains 220a and 220b are connected to ground, and the respective gate electrodes are supplied with an erase voltage of, typically 15 volts. The erase voltage is generated by charge pumps fabricated with the memory and under the control of the EEPROM controller.

Figure 24B:
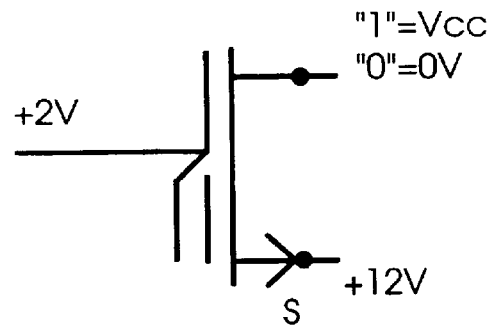

The memory cells are individually programmable, although care must be taken to ensure that the voltages on the drain terminals of cells which are not to be programmed but are in the same row as a cell selected for programming are high (Vcc), otherwise they could be inadvertently programmed. FIG. 24b schematically illustrates the write condition of the memory cells. In order to write to a cell, thereby changing the field effect transistor form a conducting state to a non conducting state, the gate terminal connected to a voltage at approximately midway between the nominal voltages for logic 1 and logic 0, typically around 2 volts, the drains of memory cells which are not to be programmed are connected to Vcc, whereas those transistors that are to be written and changed from the erased state have their drains connected to ground, thereby switching the transistor to a non-conducting state during the program cycle when the source is connected to a high (+12 volt) voltage. This results in the flow of a programming current and the occasional generation of hot electrons, some of which are injected onto the floating gate, thereby turning the transistor off.

Figure 24C:
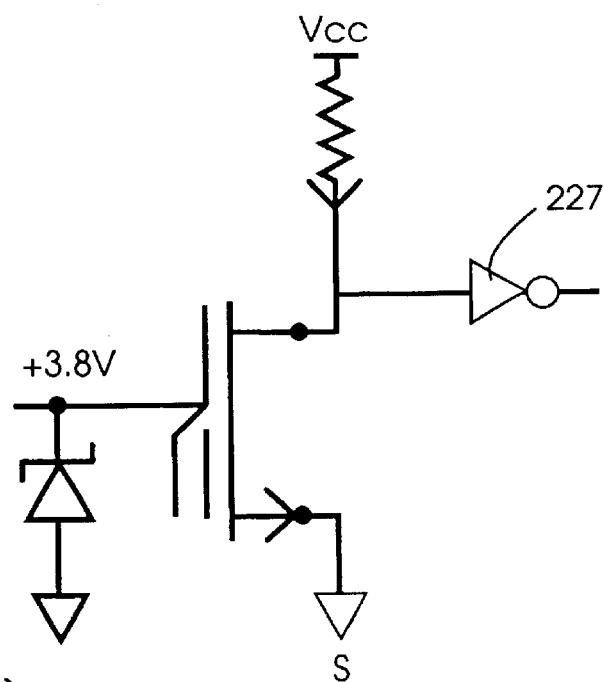

In order to read a memory cell, as shown if FIG. 24c, the address decoder sets the appropriate row line up to a voltage of approximately 3.8 Volts and the appropriate column line is connected to an input of a sense amplifier 27 which sees only a small voltage at the drain if the transistor is conducting, corresponding to logic 0, or a voltage exceeding a threshold voltage if the transistor is switched off or only weakly conducting, this corresponding to a logic 1 state. The sense amplifier has an inverting output so that an erased cell is seen to be in the logic 1 state, which is an industry standard configuration.

Figure 25:
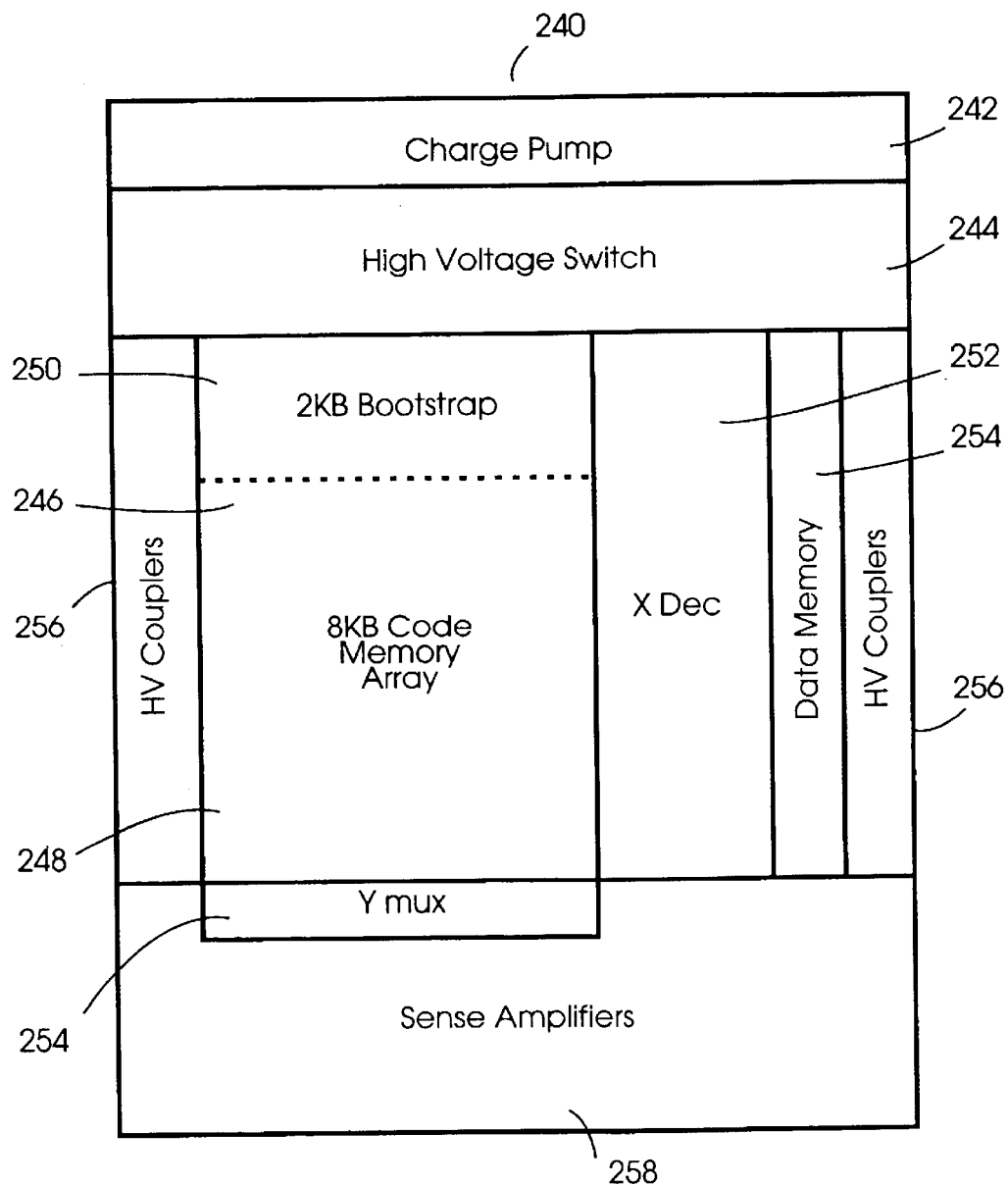
FIG. 25 schematically illustrates the layout of functional areas within a memory block constituting an embodiment of the present invention.

FIG. 25 schematically shows the layout of a memory segment which itself is formed as an integral part of a data processor, such as a micro controller, a digital signal processor or some other data processing engine. The memory segment 240 comprises a charge pump 242 for generating a controllable +12 to +15 volt supply from the +5 volts supply rail of the data processor and for supplying this voltage via high voltage switches 244 to a memory array 246 which is subdivided into a code memory area 248 and a Bootstrap memory 250. With this arrangement only one charge pump is required for the three different memory blocks. The on chip code memory occupies the lower 8 KB of memory space. In a 64 KB system, the area from 8 to 64 KB would be eternal addressable user memory. The Bootstrap memory occupies 2 KB above the 8 KB code memory but is hidden from the user and in effect on a different page of memory address space. The Bootstrap memory contains code relevant to the internal workings of the data processor, such as instructions for downloading data into the code array and for performing an initialization sequence.

The address decoder is split into a X address decoder 252 controlling the row lines within the memory array and a Y address multiplexer 254 controlling the column lines within the array. The Y address multiplexer is arranged to enable eight columns of memory at a time in order to address all eight bits of a single byte word. The X address decoder is positioned intermediate the memory array 246 and a further smaller memory array 254 which functions as a non-volatile data memory. This allows the X address decoder to be shared by, and be adjacent to, the two arrays 246 and 254. The fact that the arrays cannot logically be used at the same time allows the address decoder to be shared between them. This is because the microcontroller can only access one memory at a time. The memory blocks 254, 248 and 150 perform different tasks, have different access control rights but share the same architecture and address decoder. This represents a considerable saving in space on the silicon substrate. High voltage couplers 256 are provided on either side of the memory segment 240 for controlling connection of the high voltages to the gate connections and/or source connections (both of which run in the row direction) of the transistors forming the memory cells. A plurality of sense amplifiers for reading the contents of the memory cells and for providing a buffered output are provided in region 258.

The reading of the memory is directly under the control of the data processing core of the data processor incorporating the memory block 240. However, due to the necessity to provide high voltages for erase and write operations, these actions are controlled by a dedicated EEPROM controller which is implemented as a state machine. The interconnection between the EEPROM controller 70 and the memory block 240 is schematically illustrated in FIG. 26. EEPROM controllers are not new, but hitherto have typically been provided as asynchronous controllers, usually controlled by a ring oscillator based state machine. The data processing core has had to continuously poll a "busy" flag in the EEPROM controller to know when the erase or write cycle has finished in order to allow the core to resume normal program execution. The instructions to poll the busy bit have been stored in the bootstrap memory. The integration of the bootstrap and code memories into a single array mean that the instruction sequence for performing the poll of the "busy" bit is no longer available to the data processing core as in order to read the bootstrap memory it would become exposed to the erase/write voltages. However, by integrating the core and EEPROM controller onto the same ship and having them clocked by a common clock the EEPROM controller becomes synchronous with the data processing core. This means that the length of the erase/write cycles become predictable and consequently the core can b made to wait for the required time for the EEPROM controller to finish. Thus the core resumes executing the routine stored in the bootstrap memory exactly where it left off thereby eliminating the need to perform polling operations and pushing and popping of register contents onto and from the stack.

The EEPROM controller has a plurality of output signals which are used to control the charge pump and the connections to the gate and source electrodes. The "erase" signal is sufficient to initiate an erase sequence in its own right, as shown in FIG. 27a. An erase operation is initiated by exerting the erase signal and is terminated by setting the eeactv signal which causes the charge pumps to be discharged, and also activates, for a short period, clamp transistors to ensure that the various signal lines and control lines within the memory are returned to ground.

In a write cycle, as shown in FIG. 27b, the "prog" line is asserted in order to initiate the charge pump. It takes time for the charges to build, and so "eeactv" is used to control the high voltage switch to connect the pump to the high voltage couplers and then in combination with the address decoders 252 and 254 to the sources of the required memory cells. Then the "write" signal is asserted which places eight data signals (for one byte) on the selected column lines in order to allow the memory cells to be written to. Internal registers within the EEPROM controller are provided to control the duration and relative start times of "erase", "eeactv" and "write" signals. These times can be changed if necessary in order adapt the write sequence for minimum write time, maximum retention or to compensate for aging of the device or operation in extremes of temperature, where tailoring of the erase or write sequence may be of some advantage. Once the write pulse has finished, the "prog" signal is reset, thereby turning off the charge pumps and a little later the falling edge of the "eeactv" signal is used to operate the clamp transistors briefly to ensure that all the lines within the memory are discharged and returned to ground.

This arrangement allows the microcontroller to reprogram its own EEPROM.

Figure 28:
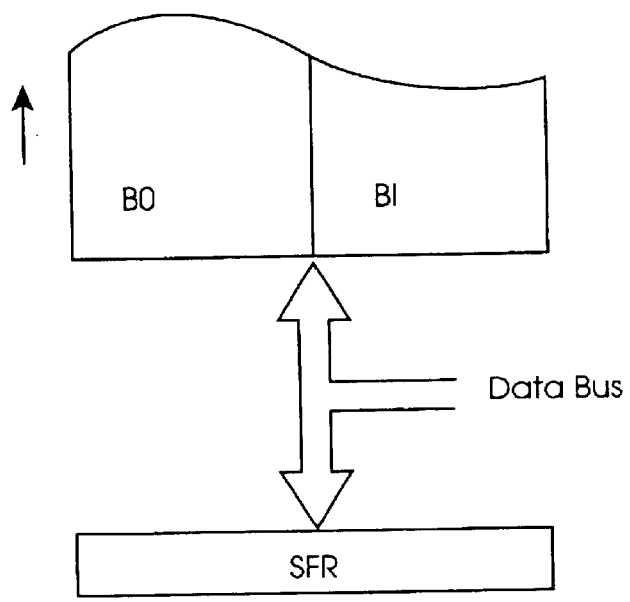
FIG. 28 schematically illustrates the relationship between the non-volatile data memory and the associated register.

The non-volatile data memory is provided as thin array, in the sense that the rows only correspond to a relatively small number of bits. The memory could be fabricated only one byte wide, thereby forming a true EEPROM. However in a preferred embodiment (FIG. 28) the data memory is two bytes wide B0 and B1 and four special purpose registers SFR are provided so that two entire rows of data (because rows of memory are paired by virtue of having a common source connection) may be loaded into the registers and then one or more bytes of a row may be modified. The EEPROM controller then erases the pair of rows and then writes the contents of the registers back into the rows, there by giving the ability to simulate true EEPROM functionality within a flash EEPROM architecture.

Figure 29:
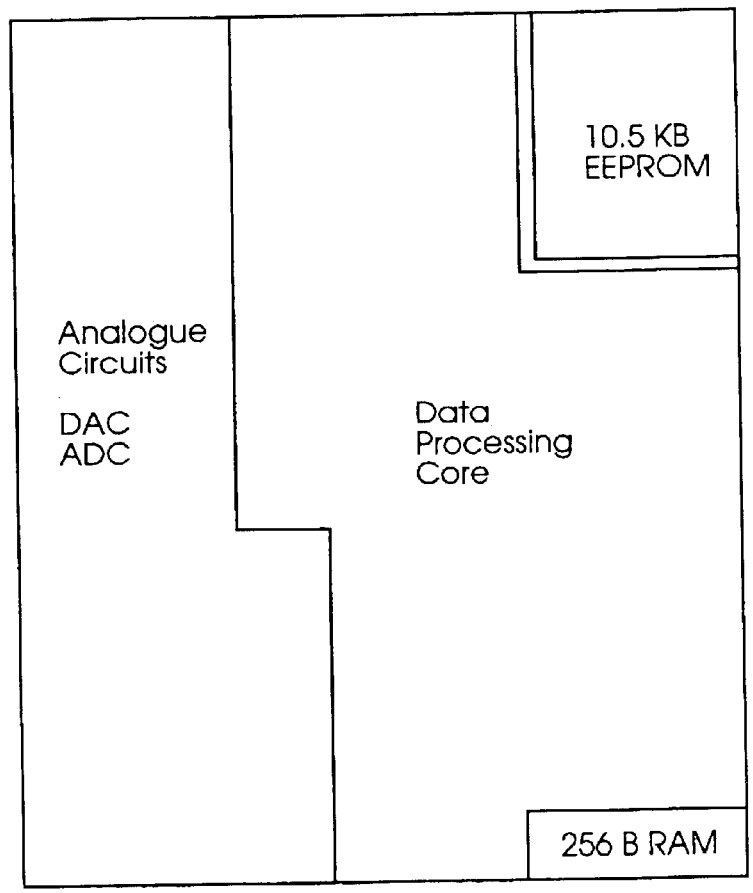
FIG. 29 schematically illustrates the layout of a data processor constituting an embodiment of the present invention, and showing the relative sizes of memory types.

FIG. 29 schematically illustrates the layout of the data processor having a memory segment including a 10.5 kilobyte EEPROM of the type illustrated in FIG. 25. It should be noted that the 10.5 kilobyte EEPROM block only occupies about three times the space of 256 bytes of RAM. Thus the level of space saving by integrating the various different memory functions of code memory, bootstrap memory and non-volatile data memory within a single EEPROM block results in a significant space saving on the silicon.

It is thus possible to integrate a plurality different memory types within a single memory architecture. This provides a space saving by avoiding the duplication of address decoders, sense amplifiers and charge pumps. Furthermore, by limiting the memory architecture to a single type, fabrication complexity is reduced as the memory type used herein and described in U.S. Pat. No. 5,242,848 carries only a modest processing overhead over formation of CMOS transistors. The integration of the EEPROM controller within the data processor and its interaction with the processor core by means of the idle condition and clock counting to determine when the EEPROM controller has finished erasing or writing memory enables the integration of bootstrap and code memory into a single physical memory array and also provides a simple and robust control scheme between the EEPROM controller and the data processing core. Thus the code memory 248, the data memory 254 and even the bootstrap memory 250 can modified/rewritten.

Process Simplification

A traditional Flash EEPROM process can have up to 20 or 21 mask steps due to tunnel oxide formation, extra drain engineering to support high voltage and other complexities. The control gate and floating gate polysilicon layers typically cannot be used to make high quality capacitors since their spacings are optimized for cell coupling, and the floating gate may be thin and undoped. Therefore previous attempts to integrate high resolution analog circuits with EEPROM have been either impossible, or uneconomic if extra layers or masks have to be added.

Although some attempts have been made to add EPROM cells to analog mixed signal processes by using the Poly- Poly capacitor layers as a control gate, floating gate cell, these have also been impractical for anything more than a few tens of bits since the cell has to be quite large to get enough coupling ratio for programming. Also the lack of a tunnel oxide means they cannot be erased, i.e. they are typically programmable only once.

In the chip described herein, the split gate EEPROM cell does not need a tunnel oxide or drain engineering, therefore the process used for fabrication can be much simpler, requiring only a few extra masks over a regular CMOS process.

Although metal-Poly capacitors have lower capacitance and greater variability than Poly-Poly capacitors, their use in the analog circuits eliminates the need for any additional layers or mask steps. The lower capacitance and greater variability of the metal poly capacitors has been circumvented by the use of a calibration algorithm, matching and centroiding techniques, and liberal use of dummies.

Thus these combinations of processes and layouts have for the first time permitted the economic integration of a high resolution analog-to-digital converter on the same silicon as high density EEPROM and a microcontroller.

With reference to FIG. 32, the present invention includes two DACs (in addition to the DAC internal to the ADC). One of these is a current source DAC and the other is a multiplying resistor string DAC. These both have respective voltage buffer amplifiers on their outputs.

As described above, the provision of dedicated DACs means that the microcontroller 24 and its timer/counters are freed up for other uses during digital-to-analog conversions. Furthermore, this is achieved without requiring software modifications to be made to code which can run on existing 8051 compatible microcontrollers.

FIG. 32 also shows a 2-wire serial port. This in conjunction with the microcontroller's ability to program its own EEPROM allows new program code to be downloaded via the serial connection.

What is claimed is:

1. An CMOS integrated circuit including analog and digital circuitry, said circuit having only two polysilicon layers on a CMOS substrate, wherein said digital circuitry includes an EEPROM memory comprising a floating gate formed from one polysilicon layer and a control gate formed from the other polysilicon layer, and said analog circuit includes at least one capacitor having one polysilicon electrode and one metal electrode.

2. The integrated circuit of claim 1, wherein the analog circuitry comprises at least one analog-to-digital converter, and said at least one capacitor forms a component within said analog-to-digital converter.

3. The integrated circuit of claim 2, wherein the analog-to-digital converter further includes a binary trim array for trimming out the capacitance variations resulting from the use of polysilicon—metal capacitors.

4. The integrated circuit of claim 3, wherein said analog-to-digital converter is arranged to acquire calibration values for the trim array from said EEPROM.

5. The integrated circuit of claim 4, wherein the analog-to-digital converter is arranged to acquire its calibration values at power up of the integrated circuit.

6. The integrated circuit of claim 4, further including a micro-controller arranged to cause the analog-to-digital converter to acquire the calibration values.

7. The integrated circuit of claim 3, further including a micro-controller arranged to write calibration values for said trim array to the EEPROM.

8. The integrated circuit of claim 2, wherein said analog-to-digital converter has a plurality of channels, and calibration coefficients are associated with each one of the channels.

9. The integrated circuit of claim 1, further including means for erasing said EEPROM by tunneling between said two polysilicon layers.

10. The integrated circuit of claim 1, wherein the analog circuitry comprises a digital-to-analog converter which can be calibrated with calibration values held in the EEPROM.

11. The integrated circuit of claim 10, further including a micro-controller arranged to cause the digital-to-analog converter to acquire its calibration values.

12. The integrated circuit of claim 10, further including a micro-controller arranged to write to the EEPROM calibration values for the digital-to-analog converter.

13. The integrated circuit of claim 1, wherein the EEPROM is divided into at least two separate memories which are selected from the group comprising bootstrap memory, program memory and data memory, and wherein the at least two memories are of the same construction.

14. The integrated circuit of claim 1, further including a digital-to-analog converter selected from the group comprising a string digital to analog converter and a current source digital to analog converter; and an operational amplifier coupled to the digital to analog converter output.

15. The integrated circuit of claim 1, further including a micro-controller and a serial port, the micro-controller arranged to download a user's program via the serial port and to write it into the EEPROM.

16. The integrated circuit of claim 1, further including a device for generating voltages for programing the EEPROM and erasing the EEPROM.

17. The integrated circuit of claim 16, wherein the device for generating the programming and erase voltages is a charge pump.

18. A CMOS integrated circuit including analog and digital circuitry, said circuit having two polysilicon layers on a CMOS substrate, wherein said digital circuitry includes an EEPROM memory comprising a floating gate formed from a first one of the polysilicon layers and a control gate formed from a second one of the polysilicon layers, and said analog circuit comprises a digital-to-analog converter which can be calibrated using calibration values stored in said EEPROM.

19. The CMOS integrated circuit of claim 18, further including means for erasing the EEPROM by tunneling between polysilicon layers.

20. The CMOS integrated circuit of claim 18 in which the digital-to-analog converter is a current source DAC having a calibratable array of current sources.

* * * * *